US012320501B2

(12) United States Patent
Cohen et al.

(10) Patent No.: US 12,320,501 B2
(45) Date of Patent: Jun. 3, 2025

(54) FRAME FOR LIGHTING OR JUNCTION BOX AND I-BRACKET

(71) Applicant: AMP Plus, Inc, Vernon, CA (US)

(72) Inventors: Brandon Cohen, Vernon, CA (US); Ivan Madrigal, Paramount, CA (US)

(73) Assignee: AMP Plus, Inc., Vernon, CA (US)

( * ) Notice: Subject to any disclaimer, the term of this patent is extended or adjusted under 35 U.S.C. 154(b) by 30 days.

(21) Appl. No.: 18/101,056

(22) Filed: Jan. 24, 2023

(65) Prior Publication Data

US 2023/0341113 A1 Oct. 26, 2023

Related U.S. Application Data

(63) Continuation-in-part of application No. 17/725,380, filed on Apr. 20, 2022, now Pat. No. 12,196,390.

(51) Int. Cl.
*F21V 21/04* (2006.01)
*F21V 23/06* (2006.01)

(52) U.S. Cl.
CPC ............ *F21V 21/047* (2013.01); *F21V 23/06* (2013.01)

(58) Field of Classification Search
CPC ........ F21V 21/047; F21V 23/06; F21V 23/02; F21V 29/89; F21V 21/04; F21S 8/026
See application file for complete search history.

(56) References Cited

U.S. PATENT DOCUMENTS

| | | | |
|---|---|---|---|
| 1,133,535 | A | 3/1915 | Cain |
| 1,471,340 | A | 10/1923 | Knight |
| 1,856,356 | A | 5/1932 | Owen |
| 2,352,913 | A | 7/1944 | Parker |
| 2,758,810 | A | 8/1956 | Good |
| 2,802,933 | A | 8/1957 | Broadwin |
| 3,104,087 | A | 9/1963 | Budnick |

(Continued)

FOREIGN PATENT DOCUMENTS

| | | | |
|---|---|---|---|
| EP | 3521688 | A1 | 7/2019 |
| WO | WO2010051985 | A1 | 5/2010 |

(Continued)

OTHER PUBLICATIONS

US 10,816,169 B1, 10/2020, Danesh (withdrawn)

(Continued)

*Primary Examiner* — Erin Kryukova
(74) *Attorney, Agent, or Firm* — Eric Kelly

(57) ABSTRACT

A frame for supporting a light fixture has regions of its sidewall corners that are double walled and secured with at least one mechanical-fastener (e.g., a rivet) at each such region of the sidewall corners. This results in a stronger frame that is able to support heavier loads as compared to a frame without such reinforced corner regions. The frame also has holes on its largest-planar-member for attaching to I-brackets and the I-brackets may be attached to a light-fixture-can of the light fixture. The frame also has different holes, on opposing sidewalls, that may be attached to a junction-box that covers over a largest-hole of the frame. Each I-bracket has a concave-surface for concentrically pressing up against an exterior surface of the light-fixture-can. Each I-bracket may attached to the light-fixture-can and to the frame. The I-brackets permit a height of the light-fixture-can to be set at different heights.

22 Claims, 28 Drawing Sheets

(56) References Cited

U.S. PATENT DOCUMENTS

| | | | | |
|---|---|---|---|---|
| 3,773,968 | A | 11/1973 | Copp | |
| 3,913,773 | A | 10/1975 | Copp | |
| 4,880,128 | A | 11/1989 | Jorgensen | |
| 4,919,292 | A | 4/1990 | Hsu | |
| 5,303,894 | A | 4/1994 | Deschamps | |
| 5,420,376 | A | 5/1995 | Rajecki | |
| 5,957,573 | A | 9/1999 | Wedekind | |
| 6,521,833 | B1 | 2/2003 | DeFreitas | |
| 6,967,284 | B1 | 11/2005 | Gretz | |
| 7,784,754 | B2 | 8/2010 | Nevers | |
| 7,857,275 | B2 | 12/2010 | de la Borbolla | |
| 7,950,832 | B2 | 5/2011 | Tanaka | |
| 8,235,549 | B2 | 8/2012 | Gingrich, III | |
| 8,322,897 | B2 | 12/2012 | Blincoe | |
| 8,545,064 | B2 | 10/2013 | Blincoe | |
| 8,680,755 | B2 | 3/2014 | Lim | |
| 8,845,144 | B1 | 9/2014 | Davis | |
| 8,926,133 | B2 | 1/2015 | Booth | |
| 9,039,254 | B2 | 5/2015 | Danesh | |
| 9,151,457 | B2 | 10/2015 | Pickard | |
| 9,404,639 | B2 | 8/2016 | Bailey | |
| 9,523,493 | B2 | 12/2016 | Chen | |
| 9,605,842 | B1 | 3/2017 | Davis | |
| 9,673,597 | B2 | 6/2017 | Lee | |
| 9,696,021 | B2 | 7/2017 | Wronski | |
| 9,797,562 | B2 | 10/2017 | Dabiet | |
| 9,854,642 | B2 | 12/2017 | Kashani | |
| 9,890,942 | B2 | 2/2018 | Lin | |
| 9,945,548 | B2 | 4/2018 | Williams | |
| 9,964,266 | B2 | 5/2018 | Danesh | |
| 10,072,805 | B2 | 9/2018 | Bailey | |
| D832,218 | S | 10/2018 | Wronski | |
| D833,977 | S | 11/2018 | Danesh | |
| 10,139,059 | B2 | 11/2018 | Danesh | |
| 10,244,607 | B1 | 3/2019 | Kashani | |
| D847,414 | S | 4/2019 | Danesh | |
| D847,415 | S | 4/2019 | Danesh | |
| 10,247,390 | B1 | 4/2019 | Kopitzke | |
| D848,375 | S | 5/2019 | Danesh | |
| D851,046 | S | 6/2019 | Peng | |
| 10,378,738 | B1 | 8/2019 | Davis | |
| 10,408,395 | B2 | 9/2019 | Danesh | |
| 10,408,396 | B2 | 9/2019 | Wronski | |
| D864,877 | S | 10/2019 | Danesh | |
| 10,488,000 | B2 | 11/2019 | Danesh | |
| 10,551,044 | B2 | 2/2020 | Peng | |
| 10,563,850 | B2 | 2/2020 | Danesh | |
| D877,957 | S | 3/2020 | Kopitzke | |
| 10,591,120 | B2 | 3/2020 | Bailey | |
| 10,609,785 | B1 | 3/2020 | Fardadi | |
| 10,616,968 | B2 | 4/2020 | Wang | |
| 10,663,127 | B2 | 5/2020 | Danesh | |
| 10,663,153 | B2 | 5/2020 | Nikooyan | |
| 10,753,558 | B2 | 8/2020 | Danesh | |
| 10,805,997 | B2 | 10/2020 | Wang | |
| 10,816,148 | B2 | 10/2020 | Danesh | |
| D901,398 | S | 11/2020 | Danesh | |
| D902,871 | S | 11/2020 | Danesh | |
| D903,605 | S | 12/2020 | Danesh | |
| D905,327 | S | 12/2020 | Williams | |
| D907,284 | S | 1/2021 | Danesh | |
| 10,975,570 | B2 | 4/2021 | Shen | |
| 10,982,829 | B2 | 4/2021 | Danesh | |
| 10,989,390 | B2 | 4/2021 | Lotfi | |
| 11,022,259 | B2 | 6/2021 | Bailey | |
| 11,028,982 | B2 | 6/2021 | Danesh | |
| 11,047,538 | B2 | 6/2021 | Danesh | |
| D924,467 | S | 7/2021 | Danesh | |
| D925,109 | S | 7/2021 | Danesh | |
| 11,060,705 | B1 | 7/2021 | Danesh | |
| 11,067,231 | B2 | 7/2021 | Lotfi | |
| 11,085,597 | B2 | 8/2021 | Danesh | |
| 11,118,768 | B2 | 9/2021 | Danesh | |
| 11,175,023 | B2 * | 11/2021 | Jones | F21S 8/026 |
| 2003/0210551 | A1 * | 11/2003 | Sevack | F21V 17/162<br>362/365 |
| 2008/0025031 | A1 * | 1/2008 | Wronski | F21S 8/026<br>362/365 |
| 2008/0304269 | A1 * | 12/2008 | Pickard | F21V 21/048<br>362/365 |
| 2014/0254177 | A1 | 9/2014 | Danesh | |
| 2015/0009676 | A1 | 1/2015 | Danesh | |
| 2015/0233556 | A1 | 8/2015 | Danesh | |
| 2015/0276185 | A1 | 10/2015 | Bailey | |
| 2016/0312987 | A1 | 10/2016 | Danesh | |
| 2016/0348860 | A1 | 12/2016 | Bailey | |
| 2016/0348861 | A1 | 12/2016 | Bailey | |
| 2017/0005460 | A1 | 1/2017 | Lee | |
| 2017/0045213 | A1 | 2/2017 | Williams | |
| 2017/0051880 | A1 | 2/2017 | Joye | |
| 2017/0138576 | A1 | 5/2017 | Peng | |
| 2017/0167672 | A1 | 6/2017 | Stauner | |
| 2017/0167699 | A1 | 6/2017 | Schubert | |
| 2017/0248298 | A1 * | 8/2017 | Wu | F21V 25/125 |
| 2017/0290129 | A1 | 10/2017 | Kashani | |
| 2018/0231197 | A1 | 8/2018 | Danesh | |
| 2018/0372284 | A1 | 12/2018 | Danesh | |
| 2019/0049080 | A1 | 2/2019 | Danesh | |
| 2019/0063701 | A1 * | 2/2019 | Lotfi | F21V 23/003 |
| 2019/0093836 | A1 | 3/2019 | Danesh | |
| 2019/0394849 | A1 | 12/2019 | Wang | |
| 2020/0056752 | A1 | 2/2020 | Danesh | |
| 2020/0116340 | A1 | 4/2020 | Nikooyan | |
| 2020/0149717 | A1 * | 5/2020 | Simmons, Jr. | F21V 17/005 |
| 2020/0158302 | A1 | 5/2020 | Danesh | |
| 2020/0182420 | A1 * | 6/2020 | Cohen | H02G 3/125 |
| 2020/0232624 | A1 | 7/2020 | Lotfi | |
| 2020/0236755 | A1 | 7/2020 | Wang | |
| 2020/0291652 | A1 | 9/2020 | Shen | |
| 2020/0348000 | A1 | 11/2020 | Bailey | |
| 2020/0386375 | A1 | 12/2020 | Danesh | |
| 2020/0393118 | A1 | 12/2020 | Danesh | |
| 2021/0010647 | A1 | 1/2021 | Danesh | |
| 2021/0010663 | A1 | 1/2021 | Nikooyan | |
| 2021/0033268 | A1 | 2/2021 | Danesh | |
| 2021/0041070 | A1 | 2/2021 | Danesh | |
| 2021/0071836 | A1 | 3/2021 | Danesh | |
| 2021/0080084 | A1 | 3/2021 | Danesh | |
| 2021/0262650 | A1 | 8/2021 | Danesh | |
| 2021/0356116 | A1 * | 11/2021 | Huang | F21S 8/026 |

FOREIGN PATENT DOCUMENTS

| | | | |
|---|---|---|---|
| WO | WO2018237294 | A2 | 12/2018 |
| WO | WO2018237294 | A3 | 12/2018 |
| WO | WO2019046310 | A1 | 3/2019 |
| WO | WO2019133669 | A1 | 7/2019 |
| WO | WO2019222259 | A1 | 11/2019 |
| WO | WO2019241198 | A1 | 12/2019 |
| WO | WO2021051101 | A1 | 3/2021 |

OTHER PUBLICATIONS

US 10,969,069 B2, 04/2021, Danesh (withdrawn)

SORAA LED Optical Light Engine See: https://res.cloudinary.com/soraa/image/upload/v1516986148/resources/misc/ole-more-info-pdf.pdf.

DMF DRD2 Product Publicly available at least as early as Sep. 6, 2018 Website: https://www.dmflighting.com/product/drd2/.

DMF DRD4 Product Publicly available at least as early as Sep. 6, 2018 Website: https://www.dmflighting.com/product/drd4/.

ELCO E247 Product Publicly available at least as early as Sep. 6, 2018 See attached concurrently filed NPL document with two product images of this ELCO E247 Product.

IMTRA Tide PowerLED Light Fixture See: https://www.imtra.com/1806fa8d-4593-40f4-bbf0-f9a833e92148/lighting-light-fixtures-detail.htm Publicly available at least as early as 2012.

MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/And.

(56) References Cited

OTHER PUBLICATIONS

ELCO 4" Round LED Reflector Insert Publicly available at least as early as Mar. 23, 2021 Website: https://elcolighting.com/products/4-round-led-reflector-insert.
ELCO 4" Five-Color Temperature Switch LED Reflector Inserts Publicly available at least as early as Mar. 23, 2021 Website: https://elcolighting.com/node/1432026.
SORAA VIVID MR16—GU10; https://www.soraa.com/products/19-MR16-GU10.php (last visited Nov. 9, 2021).
NORA Lighting, NIOB-2RNDC https://noralighting.com/product/niob-2rndc/.
NORA Lighting, NIO-4RPH https://noralighting.com/product/nio-4rph/.
NORA Lighting, NIOB-1RNG https://noralighting.com/product/niob-1rng/.
NORA Lighting https://noralighting.com/product-category/products/pendants/cylinder/.
NORA Lighting https://noralighting.com/product-category/products/pendants/ilene-mini-cylinder/.
BRUCK Lighting https://brucklighting.com/download/b/GX15/Spec%20Sheets/GX15%20Cylinder%20Multi-Mount%20Spec%20Sheet.pdf.
Elite LED Lighting https://iuseelite.com/product-category/architectural-cylinders/?characteristics=c%2Bq.
DMF Lighting https://www.dmflighting.com/wp-content/uploads/2021/12/DMFLighting_DCC_Spec_Sheet.pdf.

* cited by examiner

FRAME FOR LIGHTING OR JUNCTION BOX AND I-BRACKET

PRIORITY NOTICE

The present patent application is a continuation-in-part (CIP) of U.S. non-provisional patent application Ser. No. 17/725,380 filed on Apr. 20, 2022, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to frames that configured for supporting light fixtures and more specifically to such frames with reinforced corner regions and to I-brackets that attach to both a frame and to a light-fixture-can, wherein the I-brackets permit a height of the light-fixture-can to be varied with respect to the frame.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Downlights in and/or above ceilings (e.g., in a chase above a given ceiling) often have a light-fixture-can member. Often these light-fixture-can members are supported by a frame member that is located above the ceiling (in a chase space). These frame members, via hanger-bars, are then typically attached to adjacent joists (trusses or the like) above that ceiling (in a chase space), such that most of the frame member and its light-fixture-can are then located between those adjacent joists. If the light fixture is too heavy for a given frame, that frame, the hanger-bars, and/or where and/or how the light-fixture-can attaches to the frame may fail over time. It would be desirable to have a stronger frame that is capable of supporting greater loads without failing. It would be desirable to have a stronger frame by virtue of having reinforced sidewall corner regions that may be double walled and that may use a mechanical-fastener running through such double walled corner regions.

Depending upon local building codes, room location, room purpose, and/or drywall (sheetrock) availability, different ceilings may have different thicknesses. It would be desirable to have a single overall-assembly (of a frame, of I-brackets, and of a light-fixture-can) that could be used with different ceilings of different ceiling thicknesses, by virtue of the I-brackets permitting different heights of the light-fixture-can to be set with respect to the frame.

There is a need in the art for such improvements (e.g., frames with reinforced corner regions, frames configured for attachment to I-brackets, the I-brackets, and for light-fixture-cans that are configured for attachment to such I-brackets).

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe a frame-assembly (frame) and I-brackets.

In some embodiments, the frame may be configured for supporting a light fixture. In some embodiments, the frame has regions of its sidewall corners that are double walled and secured with at least one mechanical-fastener (e.g., a rivet) at each such region of the double walled sidewall corners. This results in a stronger frame that is able to support heavier loads as compared to a frame without such reinforced corner regions. In some embodiments, the frame also has holes (e.g., adjacent-holes) on its largest-planar-member for(removable) attaching to the I-brackets. In some embodiment, the I-brackets may be attached to both the largest-planar-member (of the frame) and to a light-fixture-can of the light fixture. In some embodiments, the frame also has different holes, on opposing sidewalls, that may be (removably attached to a junction-box that covers over a largest-hole of the largest-planar-member (of the frame). Note, when this junction-box is (removably) attached to the opposing sidewalls of the frame and covering over the largest-hole of the largest-planar-member (of the frame), then the light-fixture-can and the I-brackets may not be (removably) attached to the largest-planar-member (of the frame). In some embodiments, the largest-planar-member (of the frame) has slots that are configured to (removably) attached to a different junction-box. In some embodiments, when this different junction-box is attached to the largest-planar-member (of the frame) (via the slots), this different junction-box does not cover over the largest-hole of the largest-planar-member.

In some embodiments, a pair of hanger-bars may be (removably) attached to opposing sidewalls of the frame. This may be done by at least some of the exterior surfaces of the side-walls of the frame having protruding brackets-for-hanger-bar.

In some embodiments, each I-bracket may have a concave-surface for concentrically pressing up against an exterior surface of the light-fixture-can, when that I-bracket is (removably) attached to the exterior surface of the light-fixture-can. In some embodiments, each I-bracket may be simultaneously attached to the light-fixture-can and to the frame (in particular to the largest-planar-member) (e.g., by groups of differently positioned/place holes of the I-bracket). In some embodiments, the I-brackets permit a height of the light-fixture-can to be set at different heights with respect to the frame. This may be accomplished by the I-bracket having at least two different holes-for-light-fixture-can-attachment, a top-hole and bottom-hole, wherein the top-hole and the bottom-hole are fixedly spaced apart from each other. By having one overall assembly that may comprise the frame, the light-fixture-can, and at least two I-brackets, that same overall assembly may be used to install light fixtures above different ceilings (e.g., in a chase space above that given ceiling), wherein the different ceilings have different thicknesses.

It is an objective of the present invention to provide a frame for supporting a light fixture.

It is another objective of the present invention to provide a frame for supporting a light fixture, wherein the frame has reinforced corner regions.

It is another objective of the present invention to provide a frame for supporting a light fixture, wherein the frame has reinforced double wall thickness corner regions.

It is another objective of the present invention to provide a frame for supporting a light fixture, wherein the frame has reinforced double wall thickness corner regions that are further secured by a mechanical-fastener, such as, but not limited to a rivet or the like.

It is another objective of the present invention to provide a frame for supporting a light fixture, wherein the frame has reinforced interlocked corner regions.

It is another objective of the present invention to provide a frame for supporting a light fixture, wherein the frame is configured for use with a light-fixture-can or for use with a junction-box.

It is another objective of the present invention to provide a frame for supporting a light fixture, wherein the frame is configured for use with a light-fixture-can or for use with a junction-box that covers over a largest-hole of the frame.

It is another objective of the present invention to provide a frame for supporting a light fixture, wherein the frame is configured for use with two different types of junction-boxes, a junction-box that covers over a largest-hole of the frame and a different junction-box that does not cover over the largest-hole of the frame.

It is another objective of the present invention to provide a frame for supporting a light fixture, wherein the frame has sidewalls.

It is another objective of the present invention to provide a frame for supporting a light fixture, wherein the frame has sidewalls, wherein at least some exterior surfaces the side-walls have brackets that are configured to removably mounting to a hanger-bar, wherein the hanger-bar is configured to attachments to adjacent joists or the like.

It is another objective of the present invention to provide I-brackets, wherein each I-bracket may be configured to be attached simultaneously to both the frame and to a light-fixture-can.

It is yet another objective of the present invention to provide I-brackets, wherein each I-bracket may be configured to permit a height of the light-fixture-can with respect to the frame to be varied and/or set at different heights.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 4C shows an exploded front view of FIG. 4B.

FIG. 8D includes a sectional-line 8E-8E that is running through a length of the I-bracket.

FIG. 9A shows a similar front view as of FIG. 1D, except in FIG. 9A the frame-assembly-with-lighting-can shown is with a light-fixture-can and with I-brackets, wherein FIG. 9A shows the light-fixture-can at a first-height-setting.

FIG. 9B shows a similar front view as of FIG. 1D, except in FIG. 9A the frame-assembly-with-lighting-can shown is with a light-fixture-can and with I-brackets, wherein FIG. 9B shows the light-fixture-can at a second-height-setting.

REFERENCE NUMERAL SCHEDULE

Figure 1A:
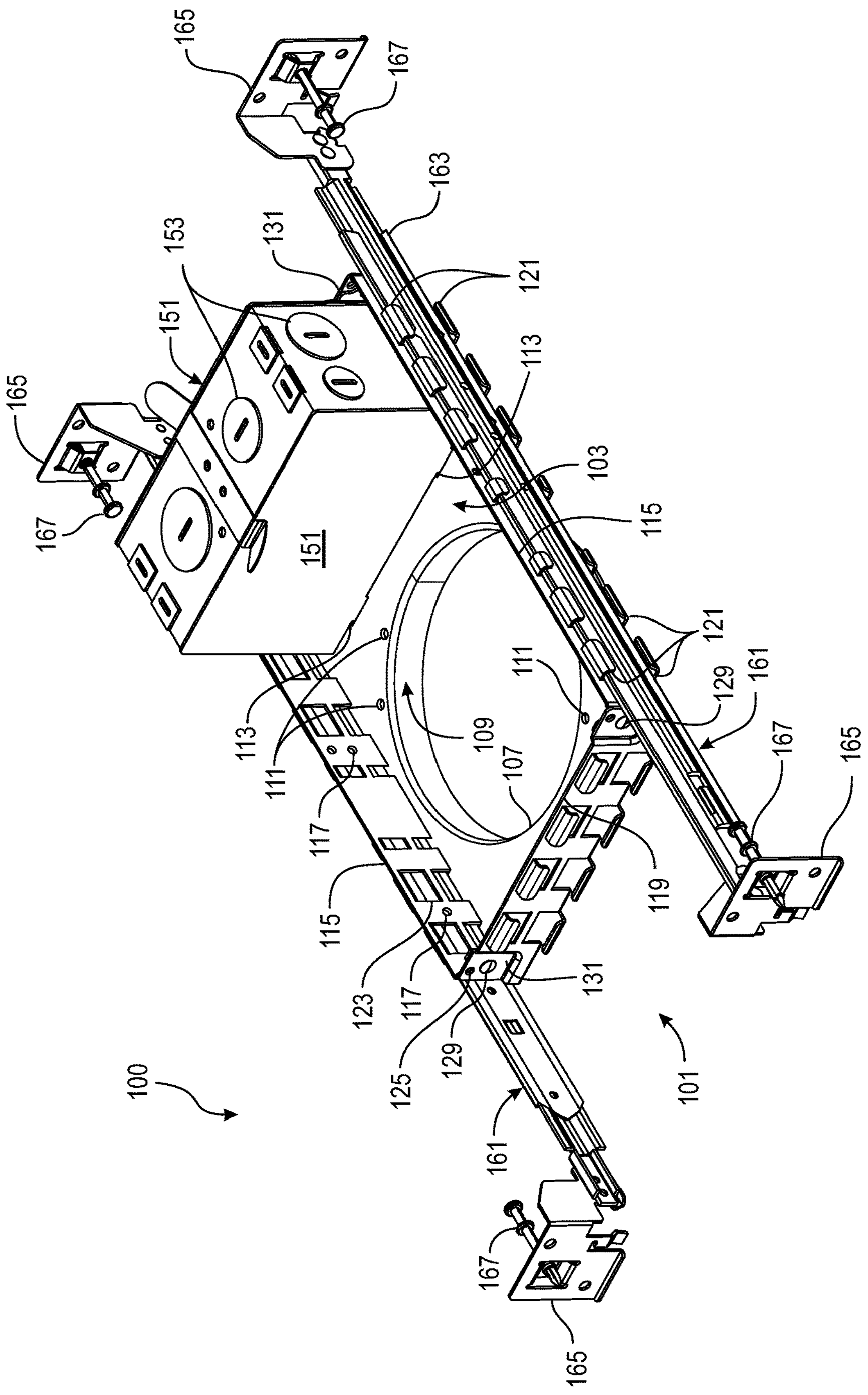
FIG. 1A depicts a top perspective view of a frame-assembly-with-hanger-bars.

100 frame-assembly-with-hanger-bars 100
101 frame-assembly 101
103 largest-planar-member 103
105 top-surface 105
107 largest-hole 107
109 collar-of-largest-hole 109
111 adjacent-hole 111
113 slot 113
115 longer-side-wall 115
117 hole 117
119 shorter-side-wall 119
121 bracket-for-hanger-bar 121
123 cutout 123
125 hole 125
129 mechanical-fastener 129
131 corner-region-of-double-wall-thickness 131
141 bottom-surface 141
143 bottom 143
145 ground-screw/bolt 145
151 junction-box 151
153 knock-out 153
161 hanger-bar 161
163 telescoping-elongate-members 163
165 joist/rafter-bracket 165
167 mechanical-fastener 167
200 frame-assembly-with-lighting-can 200
201 light-fixture-can 201
203 sidewall 203
211 I-bracket 211
221 conduit 221
300 frame-assembly-with-junction-box 300
301 junction-box 301
303 hole 303
401 hole 401
403 mechanical-fastener 403
405 mechanical-fastener 405
801 concave-surface 801
803 opposite-flat-planar-surface 803
805 top-flat-planar-surface 805
807 bottom-flat-planar-surface 807
809 side-flat-planar-surface 809
811 hole 811
811*a* top-hole 811*a*
811*b* bottom-hole 811*b*
813 (bottom) hole 813
901 bottom-of-can 901
903 first-height-setting-configuration 903
913 second-height-setting-configuration 913
1001 imaginary line 1001
1101 hole/slot 1101
1103 elliptical slot/hole 1103

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A depicts a top perspective view of a frame-assembly-with-hanger-bars 100. In some embodiments, frame-assembly-with-hanger-bars 100 may be configured for use in lighting applications. In some embodiments, frame-assembly-with-hanger-bars 100 may be configured for use in ceiling downlight lighting applications. In some embodiments, frame-assembly-with-hanger-bars 100 may be configured to (removably) receive a light-fixture-can 201 and/or a junction-box 301. In some embodiments, light-fixture-can 201 and/or junction-box 301 may be (removably) attached to frame-assembly-with-hanger-bars 100. See e.g., FIG. 2A and FIG. 2B for light-fixture-can 201 and see FIG. 3A and FIG. 3B for junction-box 301. In some embodiments, frame-assembly-with-hanger-bars 100 may be installed above a ceiling (e.g., above drywall/sheetrock and/or the like in a chase space) and below a floor/roof. In some embodiments, frame-assembly-with-hanger-bars 100 may be installed in between two (parallel) adjacent joists (trusses, rafters, and/or studs), typically in a chase space above a ceiling (or behind a wall between adjacent studs or the like).

Continuing discussing FIG. 1A, in some embodiments, frame-assembly-with-hanger-bars 100 is shown with frame-assembly 101, junction-box 151, and with hanger-bars 161 but frame-assembly-with-hanger-bars 100 is shown without light-fixture-can 201 and is shown without junction-box 301 in FIG. 1A. In some embodiments, frame-assembly-with-hanger-bars 100 may comprise one (1) frame-assembly 101. In some embodiments, frame-assembly-with-hanger-bars 100 may comprise one (1) frame-assembly 101 and one (1) junction-box 151. In some embodiments, frame-assembly-with-hanger-bars 100 may comprise one (1) frame-assembly 101 and two (2) hanger-bars 161. In some embodiments, frame-assembly-with-hanger-bars 100 may comprise one (1) frame-assembly 101, one (1) junction-box 151, and two (2) hanger-bars 161.

Continuing discussing FIG. 1A, in some embodiments, frame-assembly 101 may be the aspects of frame-assembly-with-hanger-bars 100 that do not include junction-box 151 nor hanger-bars 161. In some embodiments, frame-assembly 101 may comprise largest-planar-member 103 and surrounding/perimeter sidewalls (e.g., two parallel longer-side-walls 115 and two parallel shorter-side-walls 119). In some embodiments, largest-planar-member 103 may be a largest substantially flat and planar member. In some embodiments, when frame-assembly-with-hanger-bars 100 and/or frame-assembly 101 may be installed above a given ceiling (e.g., in a chase space above the given ceiling), a plane of largest-planar-member 103 may be at least substantially parallel with a plane of that ceiling. In some embodiments, largest-planar-member 103 may be configured to receive junction-box 151, light-fixture-can 201, and/or a junction-box 301. Shown in FIG. 1A may a top-surface 105 of largest-planar-member 103. In some embodiments, top-surface 105 may be a top surface of largest-planar-member 103. In some embodiments, top-surface 105 may be at least substantially, flat, smooth, and/or planar. In some embodiments, top-surface 105 may be below at least most of the sidewalls (e.g., two parallel longer-side-walls 115 and two parallel shorter-side-walls 119) of frame-assembly 101.

Continuing discussing FIG. 1A, in some embodiments, disposed within/on largest-planar-member 103 may be at least one (1)/only one (1) largest-hole 107. In some embodiments, largest-hole 107 may be a largest through hole of largest-planar-member 103. In some embodiments largest-hole 107 may have a fixed and predetermined shape. In some embodiments, a shape of largest-hole 107 may that of a circle. In some embodiments, largest-hole 107 may be configured to (removably) receive at least some exterior (cylindrical) portion of light-fixture-can 201 (see e.g., FIG. 2A and/or FIG. 2B). In some embodiments, junction-box 301 may be (removably) located above largest-hole 107 (see e.g., FIG. 3A and/or FIG. 3B).

Continuing discussing FIG. 1A, in some embodiments, extending (a fixed and finite distance) beneath largest-hole 107 and away from top-surface 105 may a collar-of-largest-hole 109. In some embodiments, collar-of-largest-hole 109 may be configured to guide and/or retain a (cylindrical) portion of light-fixture-can 201 (within collar-of-largest-hole 109). In some embodiments, collar-of-largest-hole 109 may be short in height hollow cylindrical member. In some embodiments, a bottom 143 of collar-of-largest-hole 109 may extend away from a bottom-surface 141 of largest-planar-member 103 by 0.25 inches to 1.0 inches. See e.g., FIG. 1C to FIG. 1G for bottom-surface 141 and bottom 143. In some embodiments, a bottom 143 of collar-of-largest-hole 109 may extend away from a bottom-surface 141 of largest-planar-member 103 by 0.50 inches, plus or minus 10%. In some embodiments, collar-of-largest-hole 109 and largest-hole 107 may be integral with each other, of a single article of manufacture. In some embodiments, a shape of collar-of-largest-hole 109 may be complementary to the shape of largest-hole 107. In some embodiments, the shape of collar-of-largest-hole 109 may at least match the shape of largest-hole 107. In some embodiments, largest-hole 107 and collar-of-largest-hole 109 may have the same inner/inside diameter.

Continuing discussing FIG. 1A, in some embodiments, disposed within/on largest-planar-member 103 may be a plurality of adjacent-holes 111. In some embodiments, adjacent-holes 111 may be located next to, adjacent to, and/or proximate to largest-hole 107. In some embodiments, a given adjacent-hole 111 may be closer to largest-hole 107 than to any other structure of largest-planar-member 103 and/or of frame-assembly 101. In some embodiments, a given adjacent-hole 111 may be located within a quarter (0.25) inch of largest-hole 107. In some embodiments, adjacent-hole 111 may be (considerably) smaller than largest-hole 107. In some embodiments, adjacent-hole 111 may be a through hole in largest-planar-member 103. In some embodiments, an inside diameter of adjacent-hole 111 may be fixed, finite, predetermined, and sized to receive at least a portion of a mechanical-fastener, such as, but not limited to, a screw, bolt, rivet, pin, and/or the like. In some embodiments, adjacent-hole 111 may be configured to (removable) attachment to an I-bracket 211. See e.g., FIG. 2A, FIG. 2B, and FIG. 8A to FIG. 8E for I-bracket 211. In some embodiments, I-brackets 211 may be used to (removably) attach light-fixture-can 201 to largest-planar-member 103; and I-brackets 211 may be used to set a height of light-fixture-can 201 (i.e., the bottom of light-fixture-can 201) with respect to frame-assembly-with-hanger-bars 100, frame-assembly 101, largest-planar-member 103, and/or bottom 143 of collar-of-largest-hole 109. In some embodiments, in terms of size and/or purpose adjacent-hole 111 may be complementary to holes 813 of a given I-bracket 211 (see e.g., FIG. 8E for holes 813 of a given I-bracket 211). In some embodiments, a same mechanical-fastener (such as, but not limited to, a screw, bolt, rivet, pin, and/or the like) may be used to attach a given I-bracket 211 to largest-planar-member 103, by that same mechanical-fastener running through both adjacent-hole 111 and a hole 813 (see e.g., FIG. 2A). In some embodiments, a given I-bracket 211 may have two (2) holes 813 (e.g., on a bottom of that I-bracket 211); and at least two (2) I-brackets 211 may be used to (removably) attach light-fixture-can 201 to largest-planar-member 103; and thus, around largest-hole 107 there may be two (2) pairs of adjacent-holes 111. In some embodiments, largest-planar-member 103 may comprise two oppositely disposed pairs of adjacent-holes 111. See e.g., FIG. 1A, FIG. 1H, and/or FIG. H. In some embodiments, a given pair of adjacent-holes 111 on largest-planar-member 103 may be fixedly spaced apart from each other, a same fixed spaced apart distance that two (2) holes 813 of a given I-bracket 211 may be spaced apart.

Continuing discussing FIG. 1A, in some embodiments, disposed within/on largest-planar-member 103 may be a plurality of slots/holes 113. In some embodiments, slots/holes 113 may be through slots and/or through holes of largest-planar-member 103. In some embodiments, these slots/holes 113 may be configured for (removable) attachment of junction-box 151 to largest-planar-member 103. In some embodiments, slots/holes 113 may be located further away from largest-hole 107 as compared to a distance between largest-hole 107 and adjacent-hole 111. In some embodiments, when junction-box 151 may be (removably) attached to largest-planar-member 103, junction-box 151 may not touch nor cover over largest-hole 107.

Continuing discussing FIG. 1A, in some embodiments, attached to and surrounding an outside perimeter of largest-planar-member 103 may be sidewalls of frame-assembly 101. In some embodiments, the sidewalls of frame-assembly 101 may provide a (vertical) fence around an outside periphery of (horizontal) largest-planar-member 103. In some embodiments, the sidewalls of frame-assembly 101 may provide structural rigidity and/or support for largest-planar-member 103. In some embodiments, sidewalls of frame-assembly 101 may be extend upwards away from top-surface 105 by a fixed, finite, and uniform height. In some embodiments, the major planes of the sidewalls may be at least substantially (mostly) orthogonal with the major/main plane of top-surface 105/largest-planar-member 103. In some embodiments, a projection of largest-planar-member 103 from a bottom view and/or from a top view of largest-planar-member 103 may yield a substantially (mostly) two-dimensional (2D) rectangular shape; and thus, the sidewalls of frame-assembly 101 may be two (at least substantially [mostly]) parallel longer-side-walls 115 and two (at least substantially [mostly]) parallel shorter-side-walls 119, to bound this 2D rectangular shape of the perimeter of largest-planar-member 103. In some embodiments, longer-side-wall 115 may be longer than shorter-side-wall 119. In some embodiments, the two (at least substantially [mostly]) parallel longer-side-walls 115 may be a same length as each other. In some embodiments, the lengths of the two (at least substantially [mostly]) parallel longer-side-walls 115 may be fixed, finite, and/or predetermined. In some embodiments, the two (at least substantially [mostly]) parallel shorter-side-walls 119 may be a same length as each other. In some embodiments, the lengths of the two (at least substantially [mostly]) parallel shorter-side-walls 119 may be fixed, finite, and/or predetermined. In some embodiments, the two (at least substantially [mostly]) parallel longer-side-walls 115 may be separated from each other by the lengths of the two (at least substantially [mostly]) parallel shorter-side-walls 119. In some embodiments, the two (at least substantially

[mostly]) parallel shorter-side-walls 119 may be separated from each other by the lengths of the two (at least substantially [mostly]) parallel longer-side-walls 115. In some embodiments, each terminal end of a given longer-side-wall 115 may be attached to a given shorter-side-wall 119. In some embodiments, each terminal end of a given shorter-side-wall 119 may be attached to a given longer-side-wall 115. In some embodiments, an angle between a longer-side-wall 115 and an attached shorter-side-wall 119, e.g., at a corner where that longer-side-wall 115 is attached to that shorter-side-wall 119 may be at least substantially (mostly) ninety (90) degrees, plus or minus 5%. In some embodiments, a projection of a top view and/or of a bottom view of frame-assembly 101 may yield a shape of the sidewalls of frame-assembly 101 that is a 2D rectangular shape. In some embodiments, a projection of a top view and/or of a bottom view of frame-assembly 101 may yield a shape of the two (at least substantially [mostly]) parallel longer-side-walls 115 and the attached two (at least substantially [mostly]) parallel shorter-side-walls 119 that is the 2D rectangular shape.

Note, in some embodiments, the term of "sidewalls" of frame-assembly 101 (frame 101) may refer to one or more of longer-side-wall 115 and/or shorter-side-wall 119.

Continuing discussing FIG. 1A, in some embodiments, a given longer-side-wall 115 may comprise at least one (1) hole 117. In some embodiments, hole 117 may be a through hole through longer-side-wall 115. In some embodiments, holes 117 may be configured for (removable) attachment of junction-box 301 to the longer-side-walls 115. In some embodiments, a same mechanical-fastener (such as, but not limited to, a screw, bolt, rivet, pin, and/or the like) may run through a hole 117 of one longer-side-wall 115 to a hole 303 of junction-box 301. See e.g., FIG. 3B for hole 303 of junction-box 301. In some embodiments, a given hole 117 of one longer-side-wall 115 may be disposed opposite from a hole 117 of the other longer-side-wall 115, such that an imaginary linear/straight line running through those two oppositely disposed holes 117 would pass directly over a portion of largest-hole 107. In some embodiments, a given longer-side-wall 115 may comprise two (2) holes 117 that fixedly spaced apart from each other with by some distance that is parallel (and less than) to a length of that given longer-side-wall 115. In some embodiments, there may be no brackets-for-hanger-bars 121 located immediately/directly above nor below a given hole 117 within a given longer-side-wall 115. In some embodiments, there may be no cutouts 123 located immediately/directly above nor below a given hole 117 within a given longer-side-wall 115. However, there may be brackets-for-hanger-bars 121 and/or cutouts 123 located to the (horizontal) sides of a given hole 117 within a given longer-side-wall 115.

Continuing discussing FIG. 1A, in some embodiments, the exterior sides of the side-walls may comprise a plurality of brackets-for-hanger-bars 121. In some embodiments, bracket-for-hanger-bar 121 may be configured to removably attach to a given hanger-bar 161. In some embodiments, bracket-for-hanger-bar 121 may allow for removable insertion and retention of a portion of a given hanger-bar 161 telescoping-elongate-member 163 within the bracket-for-hanger-bar 121. In some embodiments, longer-side-wall 115 may comprise a plurality of brackets-for-hanger-bars 121. In some embodiments, shorter-side-wall 119 may comprise a plurality of brackets-for-hanger-bars 121. In some embodiments, more brackets-for-hanger-bars 121 may fit onto longer-side-wall 115 than onto shorter-side-wall 119. In some embodiments, brackets-for-hanger-bars 121 may be located on the external/exterior vertical sides of longer-side-walls 115 and/or of shorter-side-walls 119.

Continuing discussing FIG. 1A, in some embodiments, a given (upper or lower) bracket-for-hanger-bar 121 may be formed from a given (upper or lower) cutout 123 within a given section, portion, and/or region of sidewall of frame-assembly 101. In some embodiments, a given (upper or lower) bracket-for-hanger-bar 121 may be formed from a given (upper or lower) cutout 123 within a given section, portion, and/or region of longer-side-wall 115. In some embodiments, a given (upper or lower) bracket-for-hanger-bar 121 may be formed from a given (upper or lower) cutout 123 within a given section, portion, and/or region of shorter-side-wall 119. That is, material from a given cutout 123 may be bent to form a given bracket-for-hanger-bar 121. In some embodiments, each cutout 123 may correspond to one (1) bracket-for-hanger-bar 121. In some embodiments, an upper cutout 123 and its directly below located lower cutout 123 may be separated from each other by a strip of sidewall material not included in those two (2) cutouts 123. In some embodiments, not all the brackets-for-hanger-bars 121 are equivalent in length or equally spaced. In some embodiments, brackets-for hanger bars 121 may not have equivalent lengths along one longer-side-wall 115. In some embodiments, brackets-for-hanger-bars 121 on one side (e.g., longer-side-wall 115) may have equivalent, or near equivalent (e.g., within 5%), to the lengths to the brackets-for-hanger-bars 121 on the opposing side (e.g., the other longer-side-wall 115).

Continuing discussing FIG. 1A, in some embodiments, frame-assembly 101, the sidewalls, and/or shorter-side-wall 119 may comprise at least one (1) hole 125. In some embodiments, hole 125 may be a hole within frame-assembly 101, the sidewalls, and/or shorter-side-wall 119 that is configured to (removably) receive at least one (1) ground-screw/bolt 145 (see e.g., FIG. 1B for) ground-screw/bolt 145. In some embodiments, hole 125 may be located in a corner region, portion, and/or section of frame-assembly 101, the sidewalls, and/or shorter-side-wall 119.

Continuing discussing FIG. 1A, in some embodiments, the corners of frame-assembly 101, of the sidewalls of frame-assembly 101, of longer-side-walls 115, and/or of shorter-side-walls 119 may comprise at least one (1) mechanical-fastener 129. In some embodiments, mechanical-fastener 129 may be configured to attach a terminal end of longer-side-wall 115 to a terminal end of shorter-side-wall 119, at a given corner of the sidewalls of frame-assembly 101. In some embodiments, mechanical-fastener 129 may be used to facilitate attachment of a given longer-side-wall 115 to a given shorter-side-wall 119 at a given corner of the sidewalls of frame-assembly 101. In some embodiments, the opposite terminal ends of a given longer-side-wall 115 may be bent inwards (at a ninety [90] degree angle, plus or minus 5%) to form a region-of-overlap 131 with the terminal end of a given shorter-side-wall 119, at a corner of the sidewalls of frame-assembly 101. In some embodiments, this corner-region-of-double-wall-thickness 131 may receive the mechanical-fastener 129 (through holes 401 [see e.g., FIG. 4A for holes 401]). In some embodiments, mechanical-fastener 129 may be selected from at least one: rivet, screw, bolt, staple, brad, pin, dowel, portions thereof, combinations thereof, and/or the like.

Continuing discussing FIG. 1A, in some embodiments, the corners of frame-assembly 101 and/or of the sidewalls of frame-assembly 101 may comprise at least one (1) corner-region-of-double-wall-thickness 131 (region-of-overlap 131). In some embodiments, corner-region-of-double-wall-thickness 131 may be a corner region of the sidewalls of frame-assembly 101, wherein the overall sidewall thickness is doubled by being comprised of a terminal end section of a given longer-side-wall 115 and by being comprised of a terminal end section of a given shorter-side-wall 119. In some embodiments, the opposite terminal ends of a given longer-side-wall 115 may be bent inwards (at a ninety [90] degree angle, plus or minus 5%) to form a region-of-overlap 131 (corner-region-of-double-wall-thickness 131) with the terminal end of a given shorter-side-wall 119, at a corner of the sidewalls of frame-assembly 101. In some embodiments, corner-region-of-double-wall-thickness 131 may provide structural reinforcement and increased strength to the sidewall corners of frame-assembly 101. In some embodiments, corner-region-of-double-wall-thickness 131 may provide structural reinforcement and increased strength to frame-assembly 101.

Continuing discussing FIG. 1A, in some embodiments, frame-assembly-with-hanger-bars 100 may comprise a junction-box 151. In some embodiments, junction-box 151 may be optional or omitted with respect to frame-assembly-with-hanger-bars 100 and/or with respect to frame-assembly 101. Note, junction-box 151 may be a different junction box as compared to junction-box 301. In some embodiments, junction-box 301 may be attached to the sidewalls of frame-assembly 101, such that junction-box 301 may be located directly over/above (covering over) largest-hole 107 of largest-planar-member 103. Whereas, in some embodiments, junction-box 151 may be attached to largest-planar-member 103 (not the sidewalls), such that junction-box 151 is never located directly over/above (never covering over) largest-hole 107. In some embodiments, junction-box 151 may be attached to largest-planar-member 103 (e.g., via slots/holes 113), such that junction-box 151 is located adjacent to largest-hole 107 but fixedly spaced apart from largest-hole 107. In some embodiments, junction-box 151 may be an electrical junction box. In some embodiments, one or more exterior surfaces of junction-box 151 may comprise one or more knock-outs 153. In some embodiments, a given knock-out 153 may cover over a hole when that given knock-out 153 has not been removed (knocked out); wherein that hole may provide access to an interior of junction-box 151. In some embodiments, a given knock-out 153 may be removed (knocked out) in order to run at least some electrical conduit/wiring through a given hole that is located beneath that removed knock-out 153. In some embodiments, junction-box 151 may be considered as an optional component (subassembly) to frame-assembly 101.

Continuing discussing FIG. 1A, in some embodiments, frame-assembly-with-hanger-bars 100 may comprise a pair of (at least substantially [mostly] parallel) hanger-bars 161. In some embodiments, hanger-bars 161 may be configured for attaching frame-assembly 101 to structural members of a building, such as, but not limited to joists, trusses, rafters, studs, beams, and/or the like. One portion of hanger-bar 161 may be (removably) attached to frame-assembly 101 (by use of brackets-for-hanger-bar 121); whereas, other different portion(s) of hanger-bar 161 may be attached to joists, trusses, rafters, studs, beams, and/or the like of a building. In some embodiments, a given hanger-bar 161 may comprise telescoping-elongate-members 163 and joist/rafter-brackets 165. In some embodiments, telescoping-elongate-members 163 may be elongate members that are configured to be adjustable/changeable with respect to an overall length. In some embodiments, the length(s) of telescoping-elongate-members 163 may be configured to be (removably) retained within brackets-for-hanger-bars 121 of frame-assembly 101. In some embodiments, the opposite terminal ends of telescoping-elongate-members 163 may terminate in two (2) opposing joist/rafter-brackets 165. In some embodiments, a given joist/rafter-bracket 165 may be configured to be attached to a given joist, truss, rafter, stud, beam, and/or the like. In some embodiments, a given joist/rafter-bracket 165 may be configured to be attached to a given joist, truss, rafter, stud, beam, and/or the like, via one or more mechanical-fastener(s) 167 passing at least partially through holes in joist/rafter-bracket 165 and then into the given joist, truss, rafter, stud, beam, and/or the like. In some embodiments, hanger-bar 161 may comprise one or more mechanical-fastener(s) 167. In some embodiments, mechanical-fastener 167 may be selected from: a nail, a screw, a bolt, a staple, a brad, a rivet, a pin, a dowel, and/or the like.

Figure 1B:
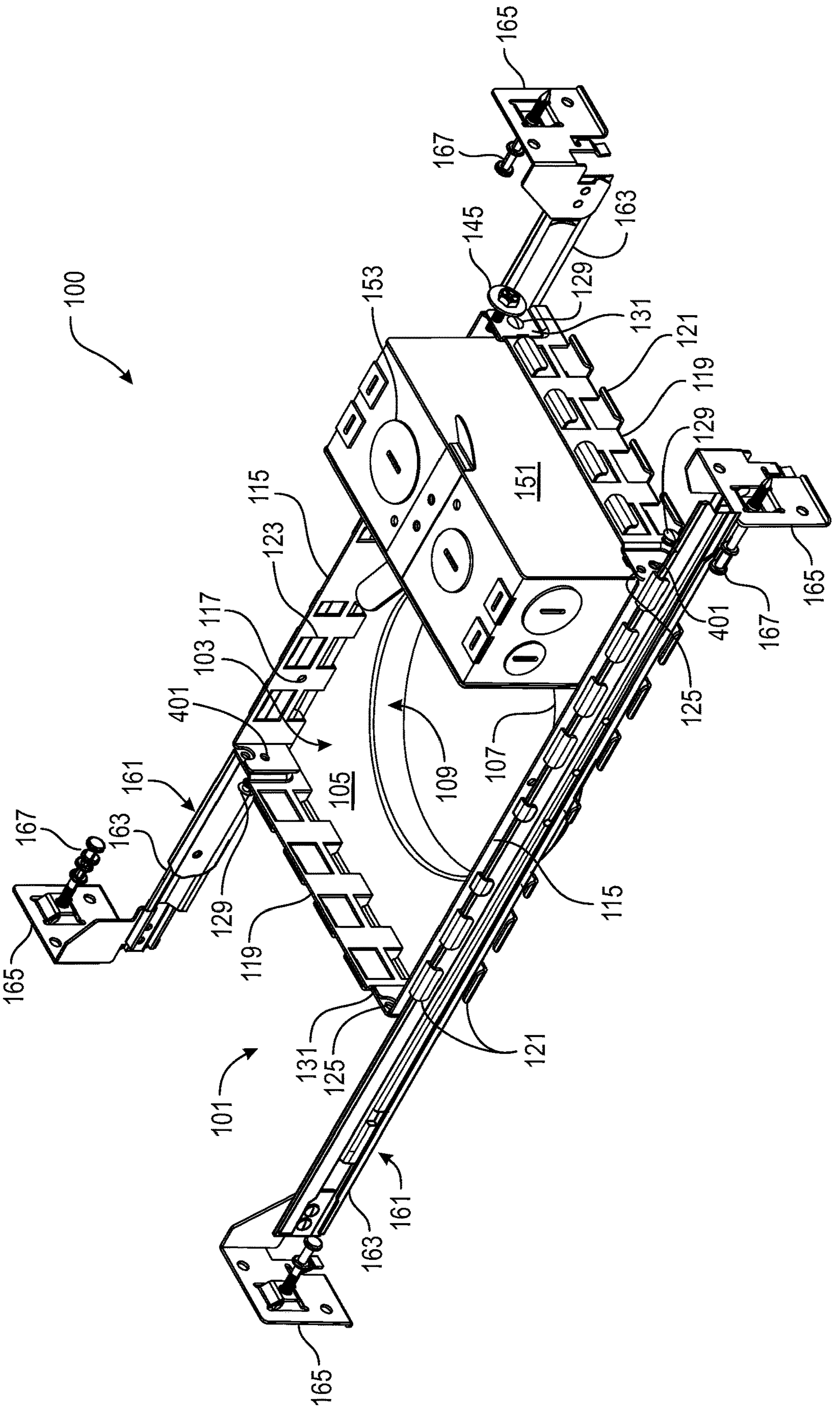
FIG. 1B depicts another/different top perspective view of the frame-assembly-with-hanger-bars as compared to FIG. 1A.

FIG. 1B depicts another/different top perspective view of frame-assembly-with-hanger-bars 100 as compared to FIG. 1A. In FIG. 1B, in some embodiments, frame-assembly 101, the sidewalls, and/or shorter-side-wall 119 may comprise at least one (1) ground-screw/bolt 145. In some embodiments, ground-screw/bolt 145 may be configured to removably attach to hole 125. In some embodiments, ground-screw/bolt 145 may be configured to removably attach to one or more ground wires.

Figure 1C:
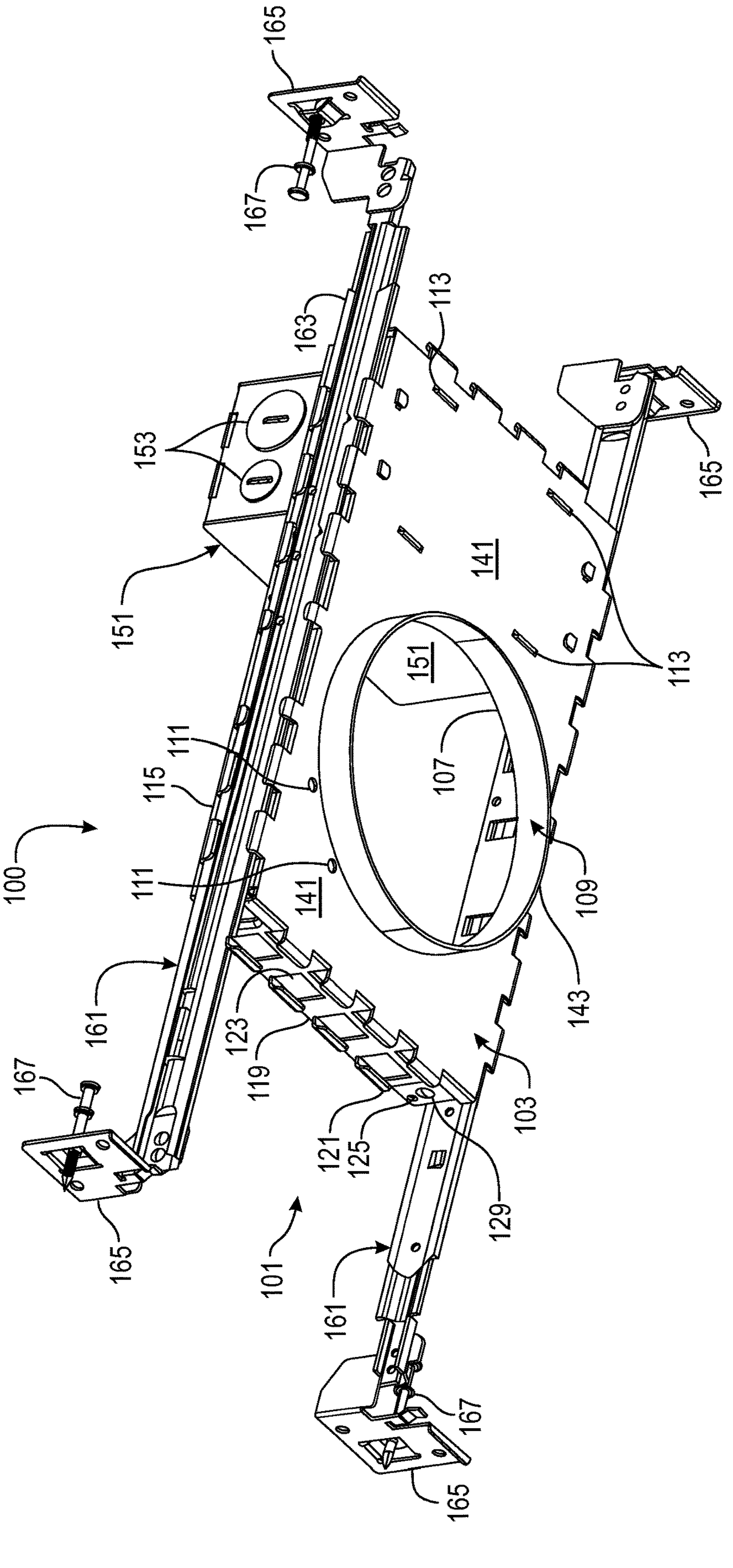
FIG. 1C depicts a bottom perspective view of the frame-assembly-with-hanger-bars of FIG. 1A.

FIG. 1C depicts a bottom perspective view of frame-assembly-with-hanger-bars 100. FIG. 1C shows bottom-surface 141 of largest-planar-member 103. In some embodiments, bottom-surface 141 may be disposed opposite from top-surface 105. In some embodiments, bottom-surface 141 may be separated from top-surface 105 by a thickness of largest-planar-member 103. In some embodiments, bottom-surface 141 and top-surface 105 may be at least substantially (mostly) parallel surfaces with respect to each other. FIG. 1C shows collar-of-largest-hole 109 extending downwards away from bottom-surface 141 (and away from top-surface 105). FIG. 1C also shows bottom 143 which may be a bottom of collar-of-largest-hole 109. In some embodiments, bottom 143 may extend beneath bottom-surface 141 by a uniform, fixed, finite, predetermined, and non-variable distance. A pair of the adjacent-holes 111 (as discussed above) are visible in FIG. 1C. FIG. 1C also shows slots/holes 113, which may be configured as points of attachment for (removably) attaching junction-box 151 to largest-planar-member 103. In some embodiments, slots/holes 113 may be points for junction-box 151 to be (removably) anchored onto largest-planar-member 103.

Figure 1D:
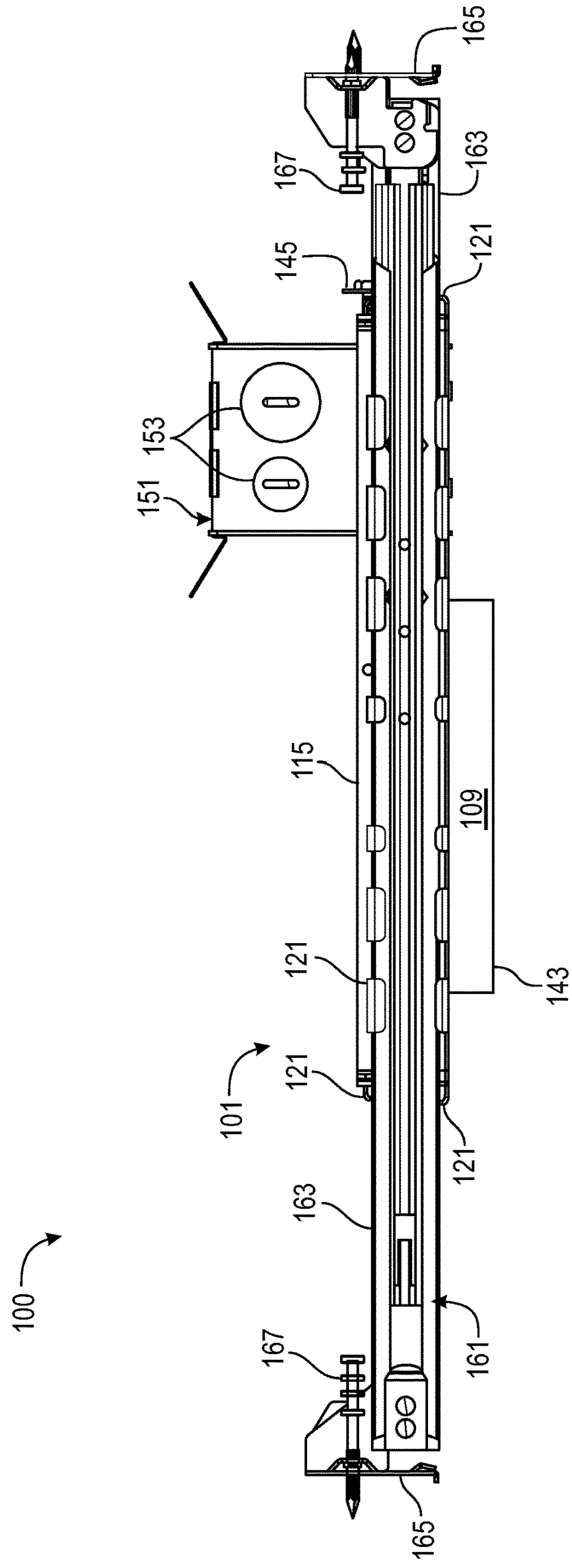
FIG. 1D may show a front view of the frame-assembly-with-hanger-bars of FIG. 1A.
Figure 1E:
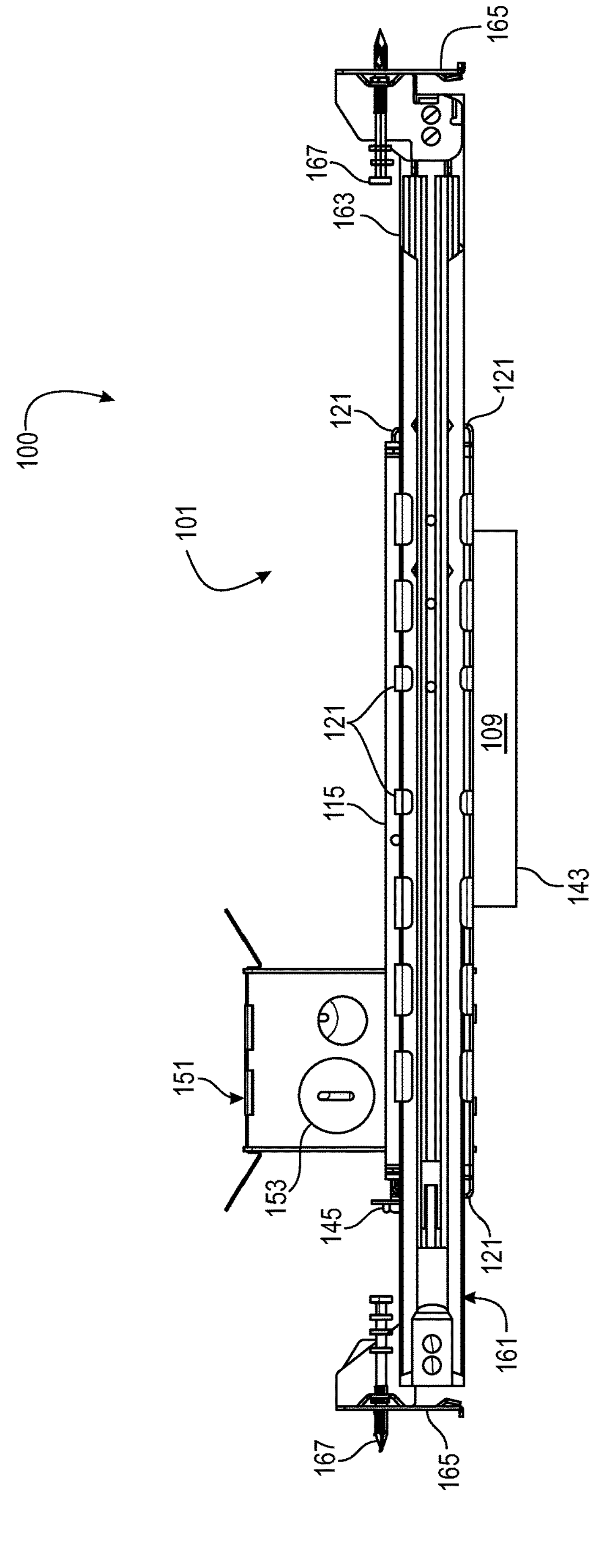
FIG. 1E may show a rear (back) view of the frame-assembly-with-hanger-bars of FIG. 1A.
Figure 1F:
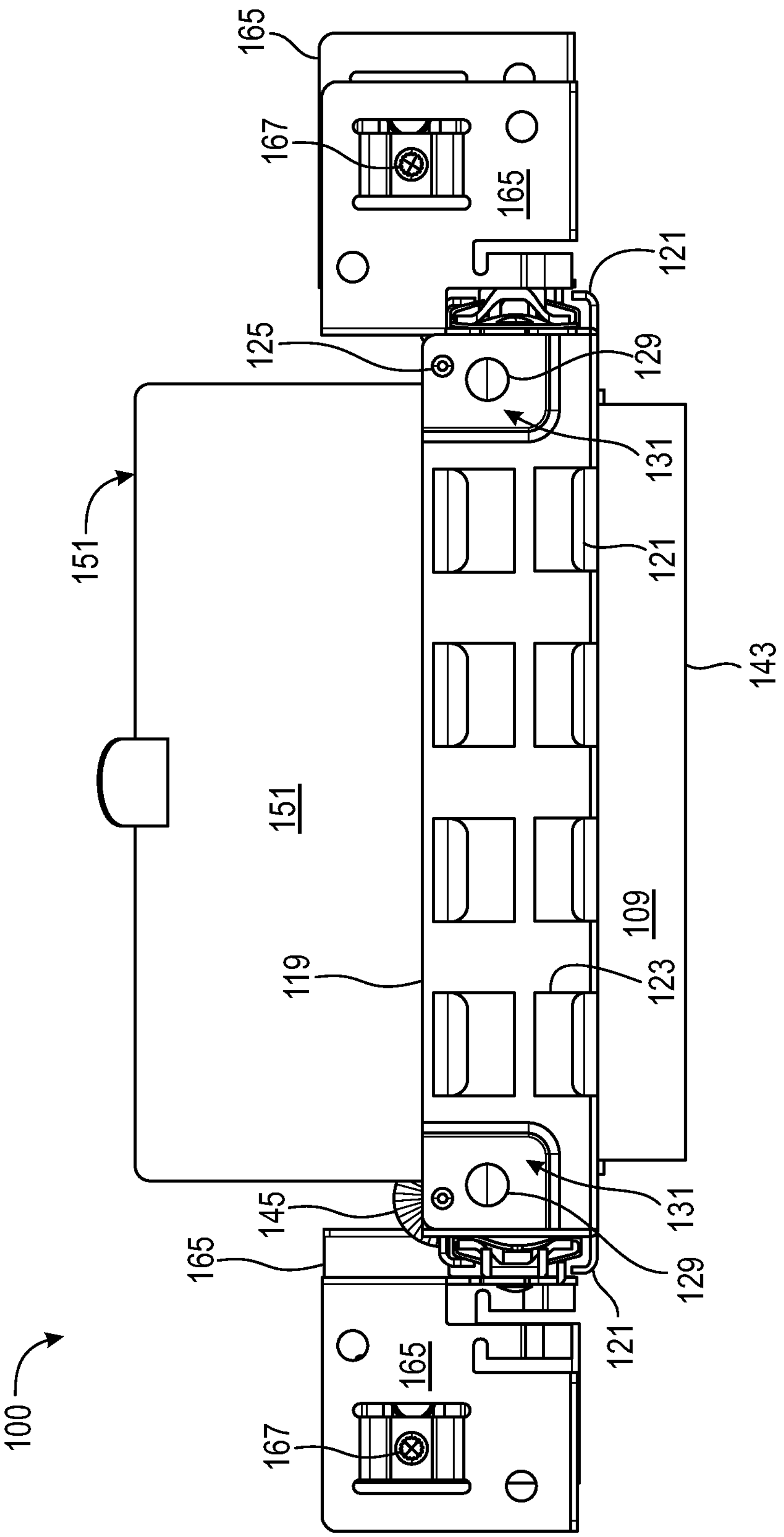
FIG. 1F may show a left-side view of the frame-assembly-with-hanger-bars of FIG. 1A.
Figure 1G:
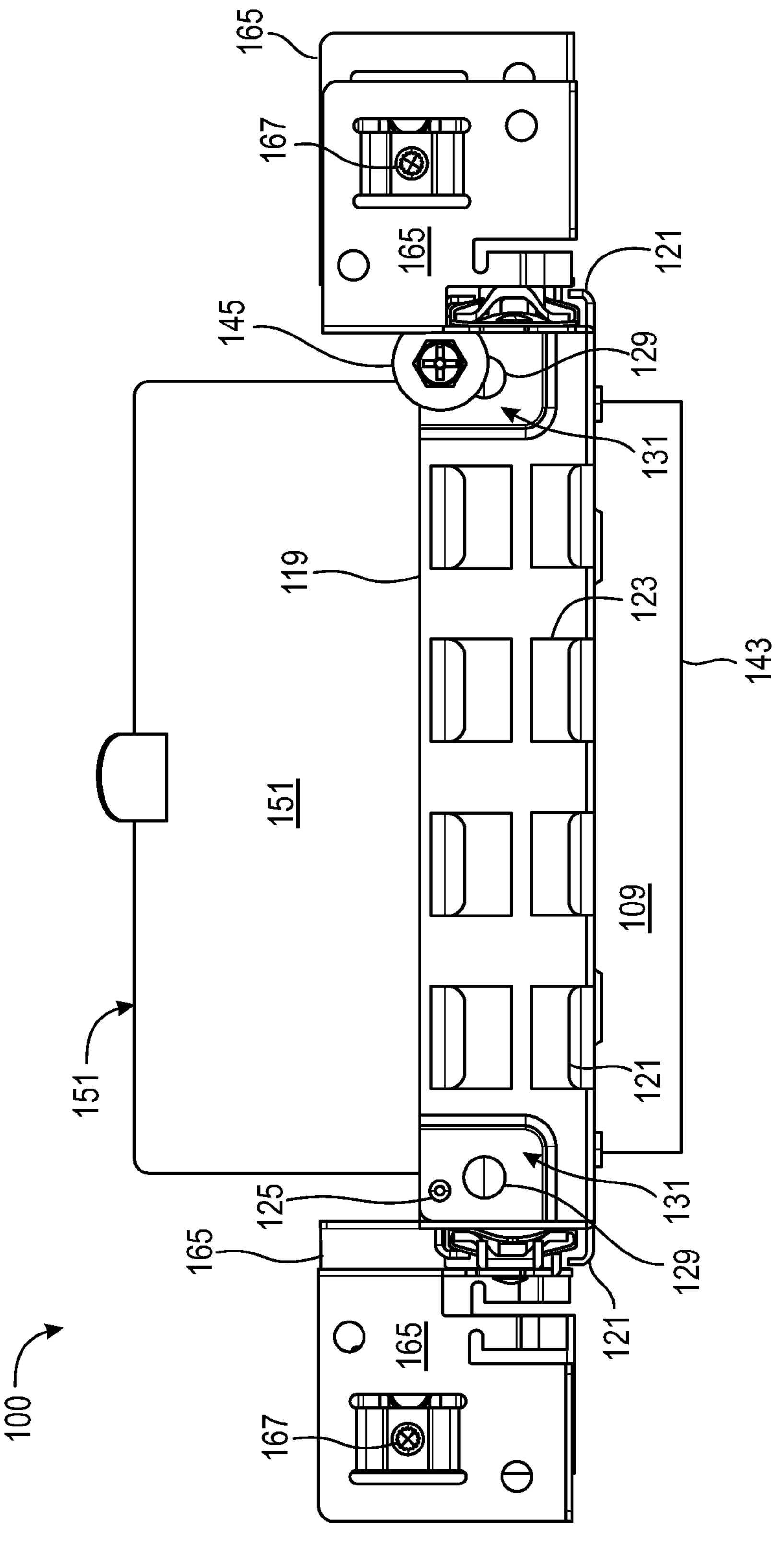
FIG. 1G may show a right-side view of the frame-assembly-with-hanger-bars of FIG. 1A.

FIG. 1D may show a front view of frame-assembly-with-hanger-bars 100. FIG. 1E may show a rear (back) view of frame-assembly-with-hanger-bars 100. In some embodiments, FIG. 1E and FIG. 1D may be opposing views from each other. FIG. 1F may show a left-side view of frame-assembly-with-hanger-bars 100. FIG. 1G may show a right-side view of frame-assembly-with-hanger-bars 100. In some embodiments, FIG. 1G and FIG. 1F may be opposing views from each other. FIG. 1F and FIG. 1G may show the exterior/outside facing portion of mechanical-fasteners 129 that may be used to make the corners of the sidewalls of frame-assembly 101 stronger. FIG. 1F and FIG. 1G may show at least some holes 125, any one of which may be configured for (removably) receiving a ground-screw/bolt 145. FIG. 1G may show a ground-screw/bolt 145 that is attached to a hole 125 (wherein its hole 125 is covered over by ground-screw/bolt 145 in FIG. 1G). FIG. 1F and FIG. 1G may show holes 125 being located above mechanical-fasteners 129 (and above holes 401 in which mechanical-fasteners 129 are retained within). FIG. 1D through FIG. 1G may show the distance that bottom 143 (of collar-of-largest-hole 109) extends beneath bottom-surface 141 (of largest-planar-member 103). FIG. 1D through FIG. 1G may show the height of the sidewalls to be uniform, non-variable, fixed, finite, and predetermined.

Note, the distinctions/designations of front, rear/back, left-side, and/or right-side of frame-assembly-with-hanger-bars 100 are arbitrary, merely being artefacts of the digital 3D modeling software used to produce these views. These distinctions/designations of front, rear/back, left-side, and/or right-side of frame-assembly-with-hanger-bars 100 are also arbitrary because once frame-assembly-with-hanger-bars 100 is installed above a given ceiling (e.g., in a chase space above that given ceiling), then frame-assembly-with-hanger-bars 100 is not visible from below that ceiling (and the same is true when frame-assembly-with-hanger-bars 100 is installed behind drywall/sheetrock of a wall).

Figure 1H:
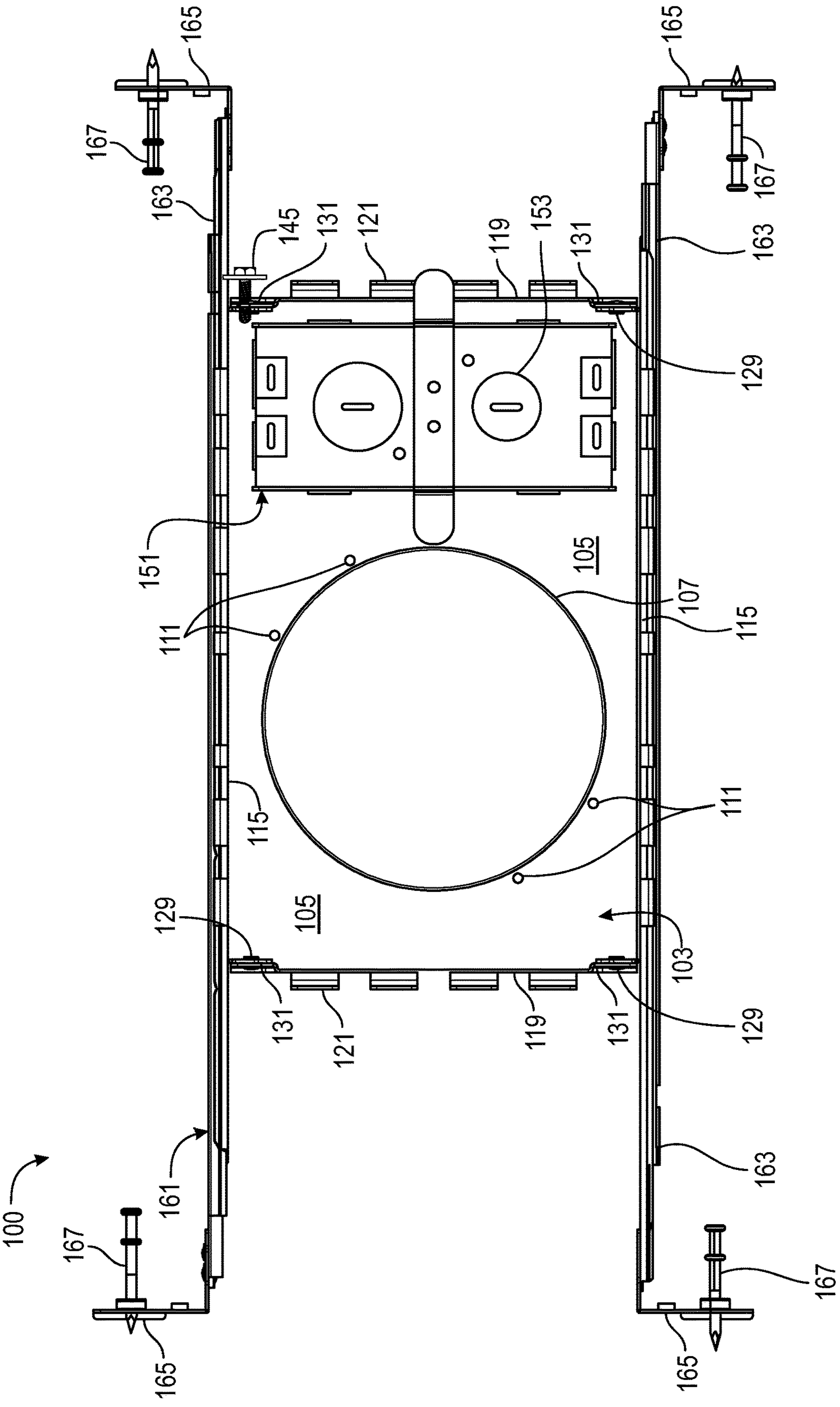
FIG. 1H may show a top view of the frame-assembly-with-hanger-bars of FIG. 1A.

FIG. 1H may show a top view of frame-assembly-with-hanger-bars 100. FIG. 1H may show that the four (4) corners of the sidewall of frame-assembly 101 may all have the corner-region-of-double-wall-thickness 131 arrangement/configuration. FIG. 1H may show that each of the four (4) corners of the sidewall of frame-assembly 101 may at least one mechanical-fastener 129 retained therein. FIG. 1H may show that the mechanical-fasteners 129 each passes through the entirety of a given corner-region-of-double-wall-thickness 131; i.e., each mechanical-fastener 129 passes entirely through this double walled thickness.

Figure 1I:
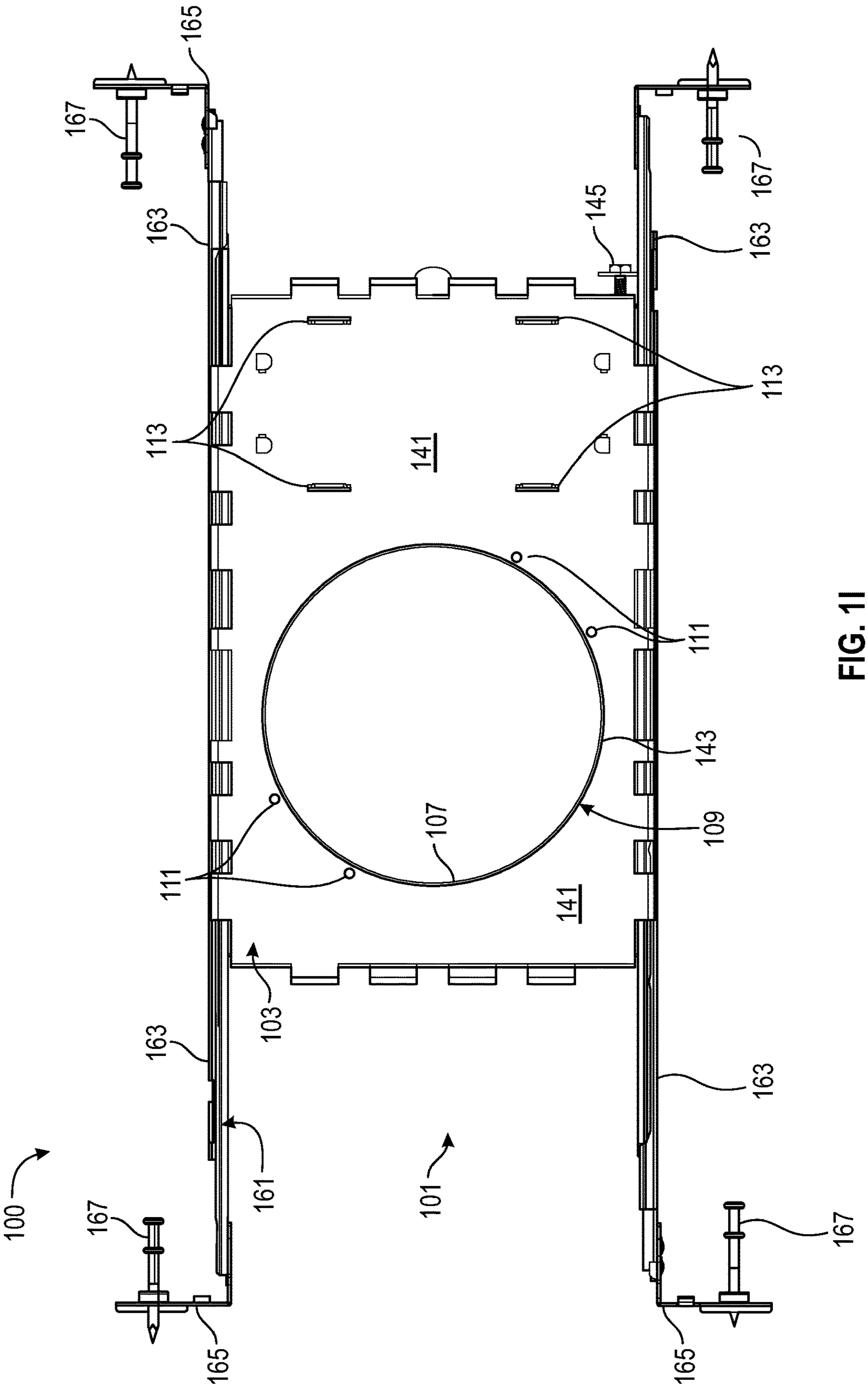
FIG. 1I may show a bottom view of the frame-assembly-with-hanger-bars of FIG. 1A.

FIG. 1I may show a bottom view of frame-assembly-with-hanger-bars 100. In some embodiments, FIG. 1I and FIG. 1H may be opposing views from each other. Note, the mechanical-fasteners 129 and/or the corner-regions-of-double-wall-thickness 131 may not be visible from the bottom view of frame-assembly-with-hanger-bars 100/frame-assembly 101. FIG. 1H and FIG. I may show the two pairs of oppositely disposed adjacent-holes 111.

Figure 2A:
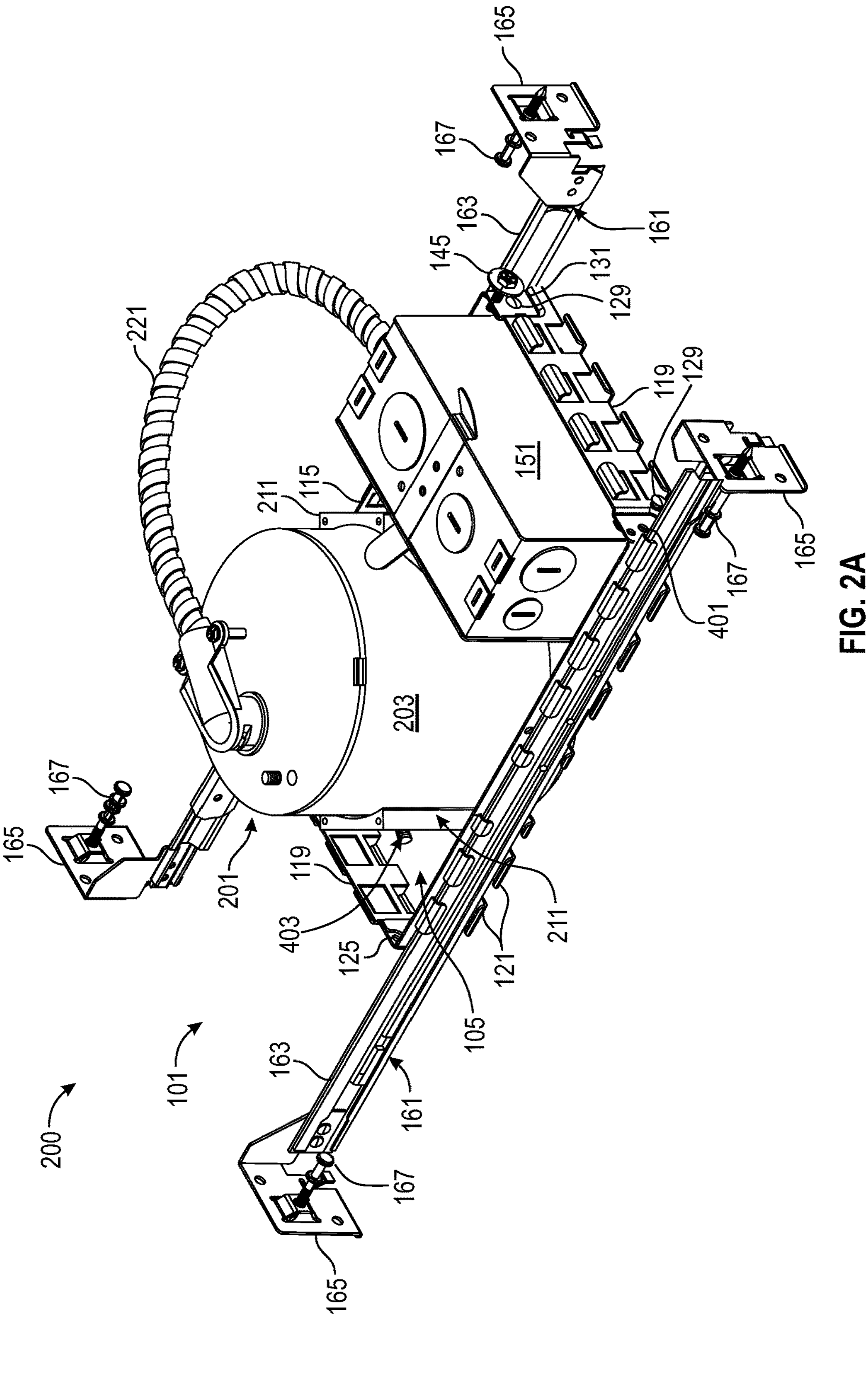
FIG. 2A shows a top perspective view of a frame-assembly-with-lighting-can.

FIG. 2A shows a top perspective view of a frame-assembly-with-lighting-can 200. In some embodiments, frame-assembly-with-lighting-can 200 may be the same as frame-assembly-with-hanger-bars 100, but with the addition of one (1) light-fixture-can 201. In some embodiments, frame-assembly-with-lighting-can 200 may comprise frame-assembly-with-hanger-bars 100 and light-fixture-can 201. In some embodiments, frame-assembly-with-lighting-can 200 may comprise frame-assembly-with-hanger-bars 100, light-fixture-can 201, and at least two (2) I-brackets 211. In some embodiments, light-fixture-can 201 may be a downlight light fixture can/housing that is configured to house lighting electronics, such as, but not limited to, at least one light source, a driver/transformer, and/or wiring/cabling. In some embodiments, light-fixture-can 201 may house other non-electric lighting elements, such as, but not limited to, at least one (conical frustum) reflector and/or at least partially one trim member. In some embodiments, light-fixture-can 201 may comprise an exterior substantially hollow cylindrical sidewall 203 member. In some embodiments, at least some of the exterior cylindrical sidewall 203 member may be (removably and/or adjustably) retained within largest-hole 107 and/or within collar-of-largest-hole 109 of largest-planar-member 103. In some embodiments, light-fixture-can 201 may be attached to largest-planar-member 103 by use of the at least two I-brackets 211. In some embodiments, bottom-flat-planar-surface 807 of a given I-bracket 211 (see e.g., FIG. 8A for bottom-flat-planar-surface 807 of I-bracket 211) may be fixedly attached to top-surface 105 of largest-planar-member 103. In some embodiments, a concave-surface 801 of a given I-bracket 211 (see e.g., FIG. 8A for concave-surface 801 of I-bracket 211) may be removably and adjustably attached to sidewall 203 member such that a bottom-most surface of sidewall 203 member is maintained in one or more positions with respect to bottom 143 of collar-of-largest-hole 109. See e.g., FIG. 9A and FIG. 9B for examples of two such different height positions of sidewall 203 member within collar-of-largest-hole 109. FIG. 2A may also show conduit 221. In some embodiments, 221 may run from junction-box 151 to light-fixture-can 201. In some embodiments, conduit 221 may be conduit that is configured to house and protect one or more electrical wires/cables running within conduit 221.

Figure 2B:
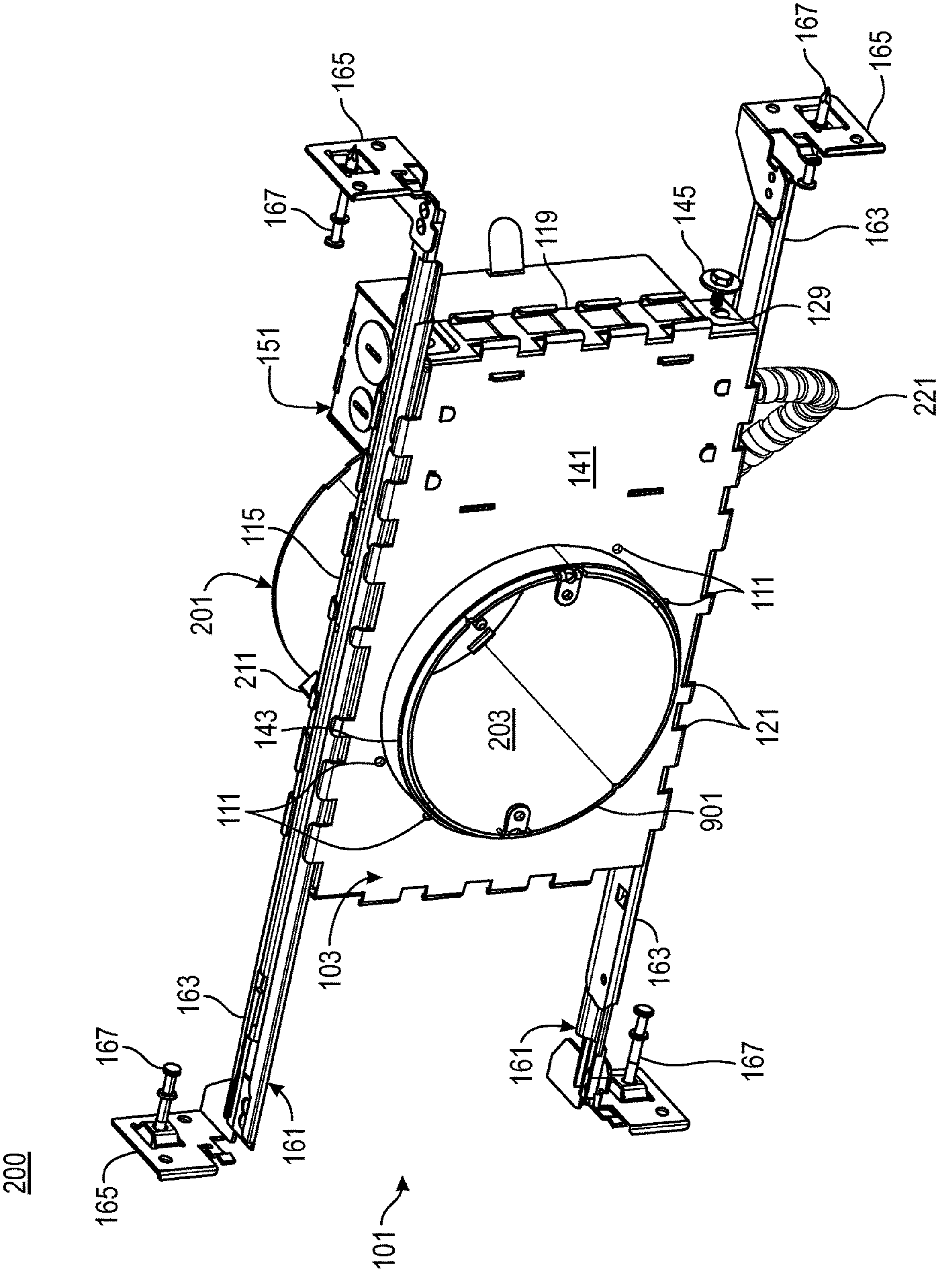
FIG. 2B shows a bottom perspective view of the frame-assembly-with-lighting-can of FIG. 2A.

FIG. 2B shows a bottom perspective view of a frame-assembly-with-lighting-can 200. From FIG. 2B, the bottom-most surface of sidewall 203 member may be seen at one particular height position extending below bottom 143 of collar-of-largest-hole 109 by a first preset distance.

Figure 3A:
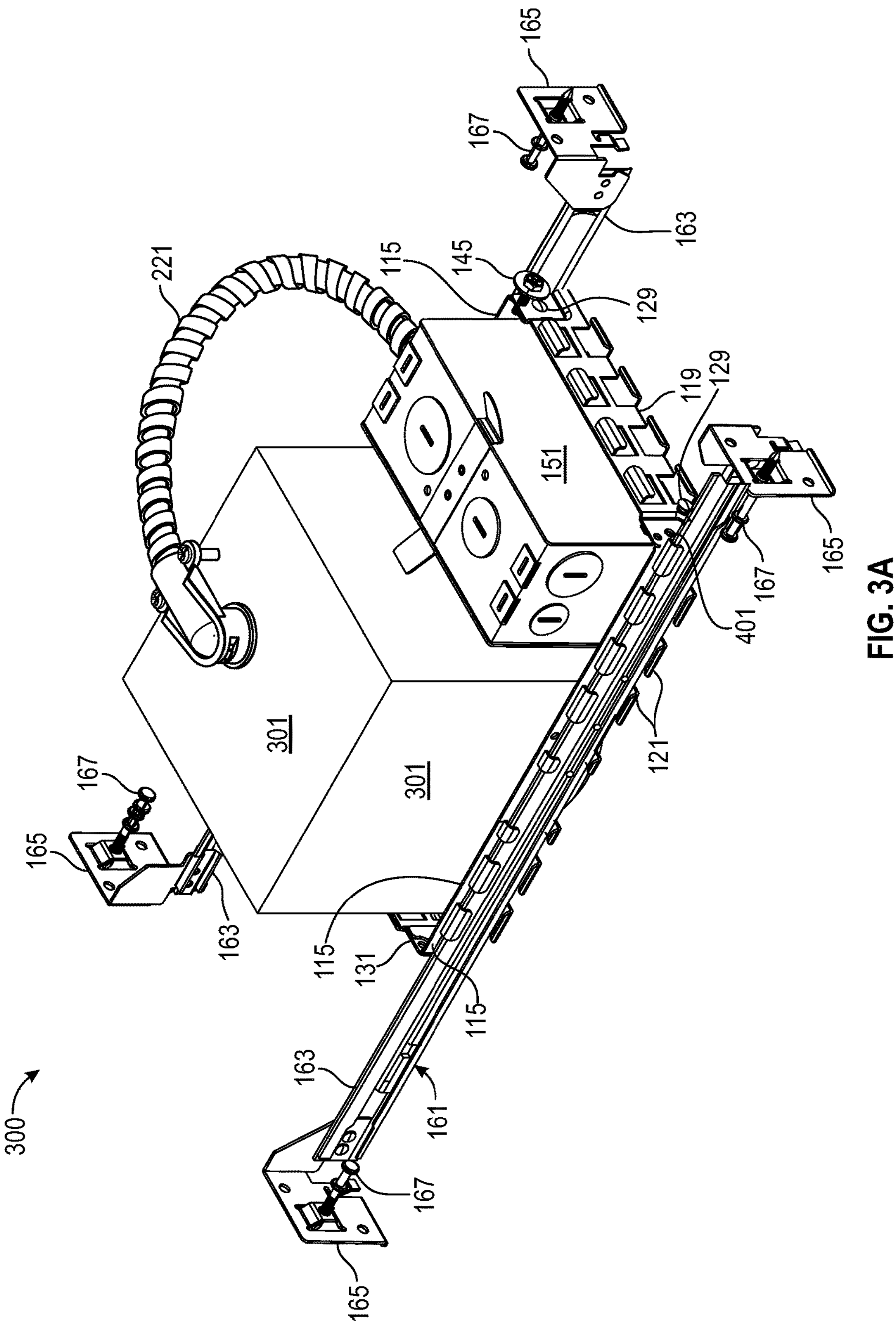
FIG. 3A shows a top perspective of a frame-assembly-with-junction-box.

FIG. 3A shows a top perspective of a frame-assembly-with-junction-box 300. In some embodiments, frame-assembly-with-junction-box 300 may be the same as frame-assembly-with-hanger-bars 100, but with the addition of one (1) junction-box 301. In some embodiments, frame-assembly-with-junction-box 300 may comprise frame-assembly-with-hanger-bars 100 and junction-box 301. In some embodiments, junction-box 301 may be (removably) attached to frame-assembly 101. In some embodiments, junction-box 301 may be (removably) attached to two (2) of the opposing sidewalls of frame-assembly 101. In some embodiments, junction-box 301 may be (removably) attached to two (2) of the opposing longer-side-walls 115. In some embodiments, when junction-box 301 may be (removably) attached to frame-assembly 101, the two (2) of the opposing sidewalls of frame-assembly 101, and/or the two (2) of the opposing longer-side-walls 115, then junction-box 301 may be located directly over largest-hole 107 and/or collar-of-largest-hole 109. In some embodiments, when junction-box 301 may be (removably) attached to frame-assembly 101, the two (2) of the opposing sidewalls of frame-assembly 101, and/or the two (2) of the opposing longer-side-walls 115, then junction-box 301 may entirely cover over largest-hole 107 and/or collar-of-largest-hole 109. In some embodiments, when junction-box 301 may be (removably) attached to frame-assembly 101, the two (2) of the opposing sidewalls of frame-assembly 101, and/or the two (2) of the opposing longer-side-walls 115, then junction-box 301 may be adjacent to (optional) junction-box 151. In some embodiments, junction-box 301 may be a junction box. In some embodiments, junction-box 301 may be an electrical junction box. In some embodiments, junction-box 301 may be a lighting housing. In some embodiments, an interior volume of junction-box 301 may be configured to (removably) retain/house one or more electronic devices/components, such as, but not limited to, at least one light source and/or electrical wiring/cabling. In some embodiments, junction-box 301 may comprise an exterior 3D (three-dimensional) shape that is at least substantially (mostly) rectangular prism shaped. In some embodiments, junction-box 301 may comprise an exterior 3D (three-dimensional) shape that is at least substantially (mostly) cube shaped. In some embodiments, junction-box 301 may comprise an exterior 3D (three-dimensional) shape that is at least substantially (mostly) block shaped.

Figure 3B:
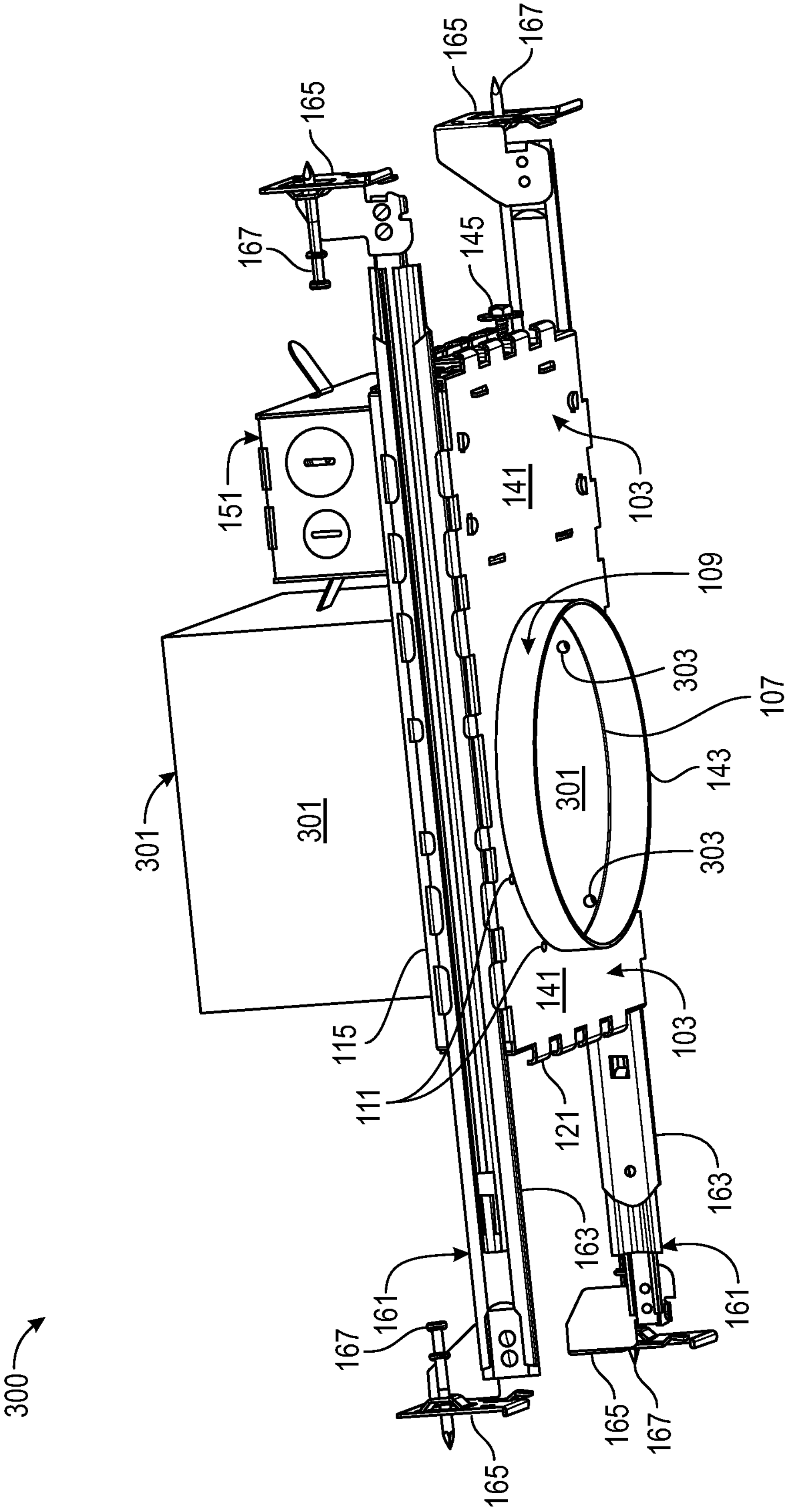
FIG. 3B shows a bottom perspective of the frame-assembly-with-junction-box of FIG. 3A.

FIG. 3B shows a bottom perspective of frame-assembly-with-junction-box 300. In some embodiments, at least two opposing sidewalls of junction-box 301 may comprise holes 303. In some embodiments, hole 303 may pass entirely through a sidewall of junction-box 301. In some embodiments, (opposing) holes 303 may be used to (removably)

attach junction-box 301 to frame-assembly 101, the two (2) of the opposing sidewalls of frame-assembly 101, and/or the two (2) of the opposing longer-side-walls 115. In some embodiments, a mechanical-fastener (such as, but not limited to, a screw, bolt, rivet, pin, and/or the like) may be used to (removably) secure/attach a hole 303 (of junction-box 301) to a hole 117 (of longer-side-wall 115). In some embodiments, a given sidewall of junction-box 301 may comprise two fixedly and spaced apart holes 303. In some embodiments, the spacing between a pair of holes 303 on a given sidewall of junction-box 301 may be the same/identical as the spacing between a pair of holes 117 on a given longer-side-wall 115. Note, holes 117 (of a given longer-side-wall 115) may be shown in FIG. 1A, in FIG. 1B, FIG. 4A, in FIG. 10A, and in FIG. 10B.

In some embodiments, junction-box 301 may not be attached to largest-planar-member 103. In some embodiments, junction-box 301 is not located adjacent to largest-hole 107 and/or collar-of-largest-hole 109, such that junction-box 301 is not covering over largest-hole 107 and/or collar-of-largest-hole 109. See e.g., FIG. 3A and FIG. 3B.

Figure 4A:
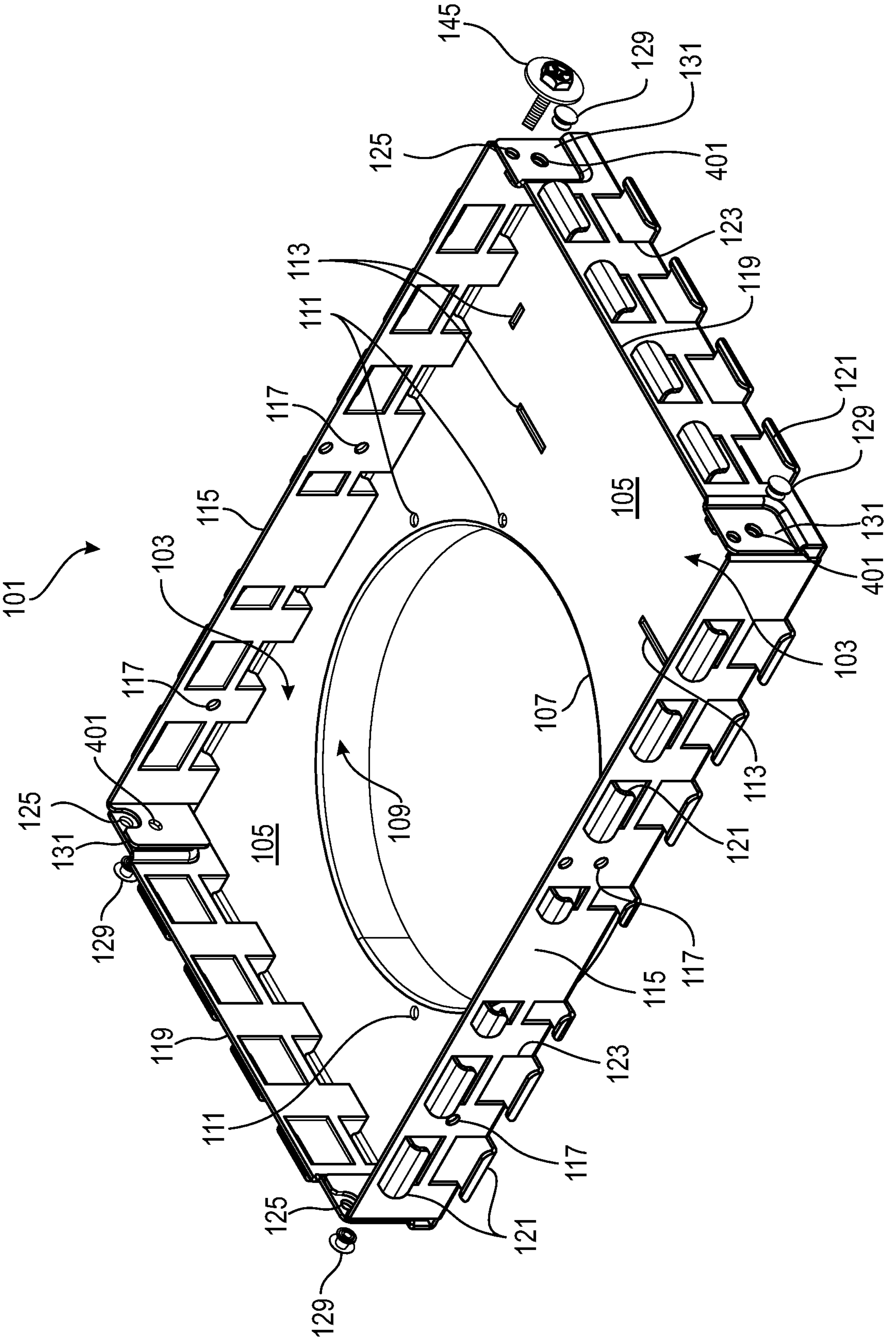
FIG. 4A shows an exploded top perspective view of just a frame-assembly (without a junction-box, without hanger-bars, without a light-fixture-can, and without a different junction-box).

FIG. 4A shows an exploded top perspective view of just frame-assembly 101 (without junction-box 151, without hanger-bars 161, without light-fixture-can 201, and without junction-box 301). FIG. 4A shows ground-screw/bolt 145 separated from its receiving hole 125. FIG. 4A also shows mechanical-fasteners 129 separated from their receiving holes 401. In some embodiments, the corners of frame-assembly 101, of the sidewalls, of longer-side-walls 115, and/or of shorter-side-walls 119 may comprise at least one (1) hole 401. In some embodiments, in a given longer-side-wall 115 and in a given shorter-side-wall 119 that are attached to each other at a given corner region, section, and/or portion of the sidewalls, each of this given longer-side-wall 115 and the attached given shorter-side-wall 119 may comprise one (1) hole 401, such that when this corner is formed, these two (2) holes 401 are colinear and concentric with each other. In some embodiments, the two colinear and concentric holes 401 of a given corner of the sidewalls (of frame-assembly 101) are configured to receive at least one (1) mechanical-fastener 129. In some embodiments, hole 401 may be located below hole 125. FIG. 4A also shows holes 117 of longer-side-walls 115, which may be used in the (removable) attachment of junction-box 301 to the two (2) opposing longer-side-walls 115.

In some embodiments, frame-assembly 101 may be referred to as frame 101. In some embodiments, frame 101 may be configured for supporting at least one light fixture. In some embodiments, frame 101 may comprise largest-planar-member 103 and sidewalls. See e.g., FIG. 4A.

In some embodiments, largest-planar-member 103 has a top-surface 105 and an oppositely disposed bottom-surface 141 that are at least substantially flat and parallel to each other. In some embodiments, largest-planar-member 103 comprises largest-hole 107 that passes entirely through a thickness of largest-planar-member 103. In some embodiments, largest-hole 107 is configured to (removably) retain at least a portion of light-fixture-can 201. Light-fixture-can 201 may be part of the at least one light fixture. See e.g., FIG. 4A.

In some embodiments, sidewalls run around an exterior perimeter of largest-planar-member 103 and are attached to largest-planar-member 103. In some embodiments, the sidewalls extend at least substantially orthogonally upwards and away from the top-surface 105. In some embodiments, two adjacent sidewalls, selected from the sidewalls, meet each other to form a corner, wherein at least a region 131 of the corner is formed of two overlapping sections of the two adjacent sidewalls; such that this at least the region 131 has double wall thickness. See e.g., FIG. 4A.

In some embodiments, largest-planar-member 103 comprises two oppositely disposes pairs of adjacent-holes 111. In some embodiments, each pair of the adjacent-holes 111 is located adjacent to largest-hole 107, within 0.25 inches from largest-hole 107. In some embodiments, each pair of the adjacent-holes 111 is located closer to largest-hole 107 than to the sidewalls or to the slots 113. See e.g., FIG. 4A. In some embodiments, each pair of the adjacent-holes 111 is configured for attachment to a bracket (e.g., an I-bracket 211). In some embodiments, the bracket (e.g., I-bracket 211) is configured for attachment to the light-fixture-can 201 (see e.g., FIG. 4B).

In some embodiments, largest-planar-member 103 comprises a collar-of-largest-hole 109 that is a collar of fixed and uniform height that extends downwards away from the side-walls and from largest-hole 107. In some embodiments, largest-hole 107 and collar-of-largest-hole 109 are colinear and/or coaxial with each other. In some embodiments, largest-hole 107 and collar-of-largest-hole 109 have a same inside diameter as each other. See e.g., FIG. 4A. In some embodiments, largest-hole 107 and collar-of-largest-hole 109 are concentric with each other. In some embodiments, collar-of-largest-hole 109 is configured to guide portions of a sidewall 103 member of light-fixture-can 201 within collar-of-largest-hole 109. See e.g., FIG. 9A and FIG. 9B.

In some embodiments, largest-planar-member 103 comprises at least one slot 113 on top-surface 105. In some embodiments, at least one slot 113 is configured for attaching to at least a portion of junction-box 151. See e.g., FIG. 4A. In some embodiments, junction-box 151 when attached to top-surface 105 is located above top-surface 105 and not above largest-hole 107. See e.g., FIG. 1A.

In some embodiments, frame 101 comprises at least one mechanical-fastener 129 per each of the at least the region 131 of the corner of the sidewalls. In some embodiments, at least one mechanical-fastener 129 secures and passes through the double wall thickness. See e.g., FIG. 4A.

In some embodiments, the sidewalls (of frame 101) comprise two longer-side-walls 115 and two shorter-side-walls 119. In some embodiments, the two longer-side-walls 115 are fixedly separated from each other by lengths of the two shorter-side-walls 119. In some embodiments, lengths of the two longer-side-walls 115 are at least substantially parallel to each other. In some embodiments, lengths of the two shorter-side-walls 119 are at least substantially parallel to each other. See e.g., FIG. 4A.

In some embodiments, terminal end portions of the two longer-side-walls 115 may be bent inwards such that the terminal end portion of one of the two longer-side-walls 115 is pointed at the terminal end portion of the other of the two longer-side-walls 115. See e.g., FIG. 7 (or FIG. 1H). In some embodiments, the terminal end portions of the two longer-side-walls 115 that are bent inwards, forms the two overlapping sections of the two adjacent side-walls. That is, this inward bending of the terminal end portions of the two longer-side-walls 115 make corner-regions-of-double-wall-thickness 131 possible and/or results in corner-regions-of-double-wall-thickness 131. See e.g., FIG. 4A.

In some embodiments, the sidewalls (of frame 101) may be of a single wall thickness everywhere except at the at least the region 131 of the corner(s). See e.g., FIG. 7 (or FIG. 1H).

In some embodiments, at least some of exteriors of the sidewalls (of frame 101) may comprise a plurality of brackets-for-hanger-bar 121. See e.g., FIG. 1A. In some embodiments, the plurality of brackets-for-hanger-bar 121 are configured to attach to hanger-bar 161. In some embodiments, hanger-bar 161 is configured to attach to two oppositely disposed elongate structural members of a building. In some embodiments, the "two oppositely disposed elongate structural members" may be selected from joists, trusses, rafters, beams, studs, engineered lumber, and/or the like. In some embodiments, the building may be a structure that is at least temporarily occupied by humans, such as, but not limited to, businesses, offices, homes, houses, condos, townhomes, sheds, garages, workshops, shops, stores, warehouses, a structure with a ceiling, a structure with a roof, and/or the like.

In some embodiments, the sidewalls (of frame 101) comprise two oppositely disposed (and at least substantially [mostly] parallel) sidewalls (such as, but not, limited to, longer-side-walls 115). In some embodiments, each of the two oppositely disposed sidewalls may comprise a pair of fixedly separated holes 117. See e.g., FIG. 4A, FIG. 10A, and FIG. 10B. In some embodiments, the pair of fixedly separated holes 117 are configured for attaching to junction-box 301. In some embodiments, junction-box 301 when attached to the two oppositely disposed sidewalls entirely covers over largest-hole 107. In some embodiments, junction-box 301 when attached to the two oppositely disposed sidewalls, is not attached to largest-planar-member 103. See e.g., FIG. 3A, FIG. 3B, and FIG. 4D.

Figure 4B:
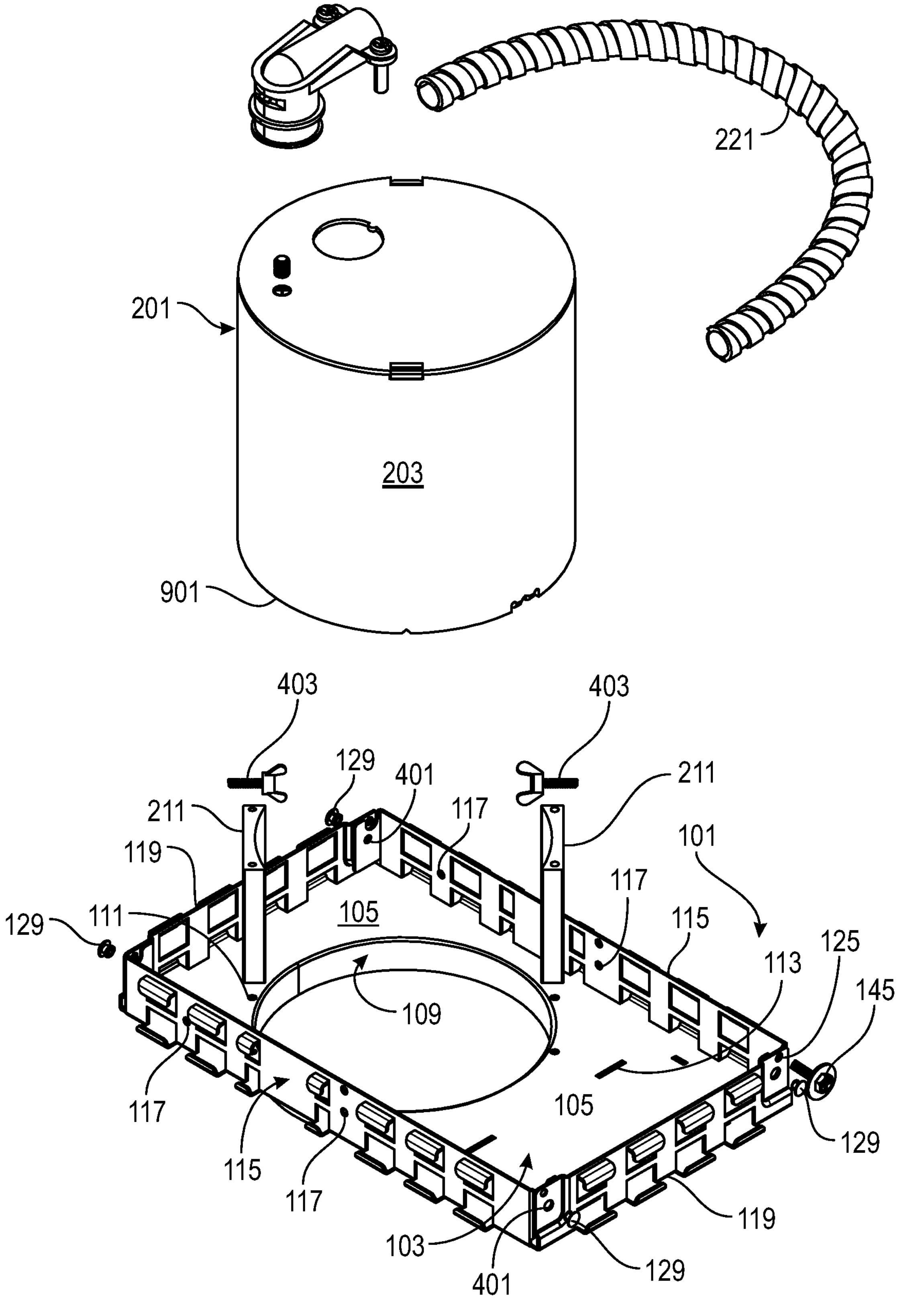
FIG. 4B shows an exploded top perspective view of a light-fixture-can and at least two (2) I-brackets separated from a frame-assembly.

FIG. 4B shows an exploded top perspective view of light-fixture-can 201 and I-brackets 211 separated from frame-assembly 101. Note, junction-box 151 is omitted in FIG. 4B. FIG. 4B shows wing-bolts 403 as the mechanical-fastener for (removably) attaching the I-brackets 211 to light-fixture-can 201. In some embodiments, a portion of a given wing-bolt 403 may pass through a hole in the sidewall 203 and also into/through hole 811 of I-bracket 211 (see e.g., FIG. 8A for hole 811 of I-bracket 211). FIG. 4B also shows how the I-brackets 211 may be (removably) attached to largest-planar-member 103. In some embodiments, a portion of a mechanical-fastener may be pass through a given adjacent-hole 111 (of largest-planar-member 103) and then into hole 813 in a bottom of the given I-bracket 211 (see e.g., FIG. 8E for hole 813 of I-bracket 211).

Figure 4C:
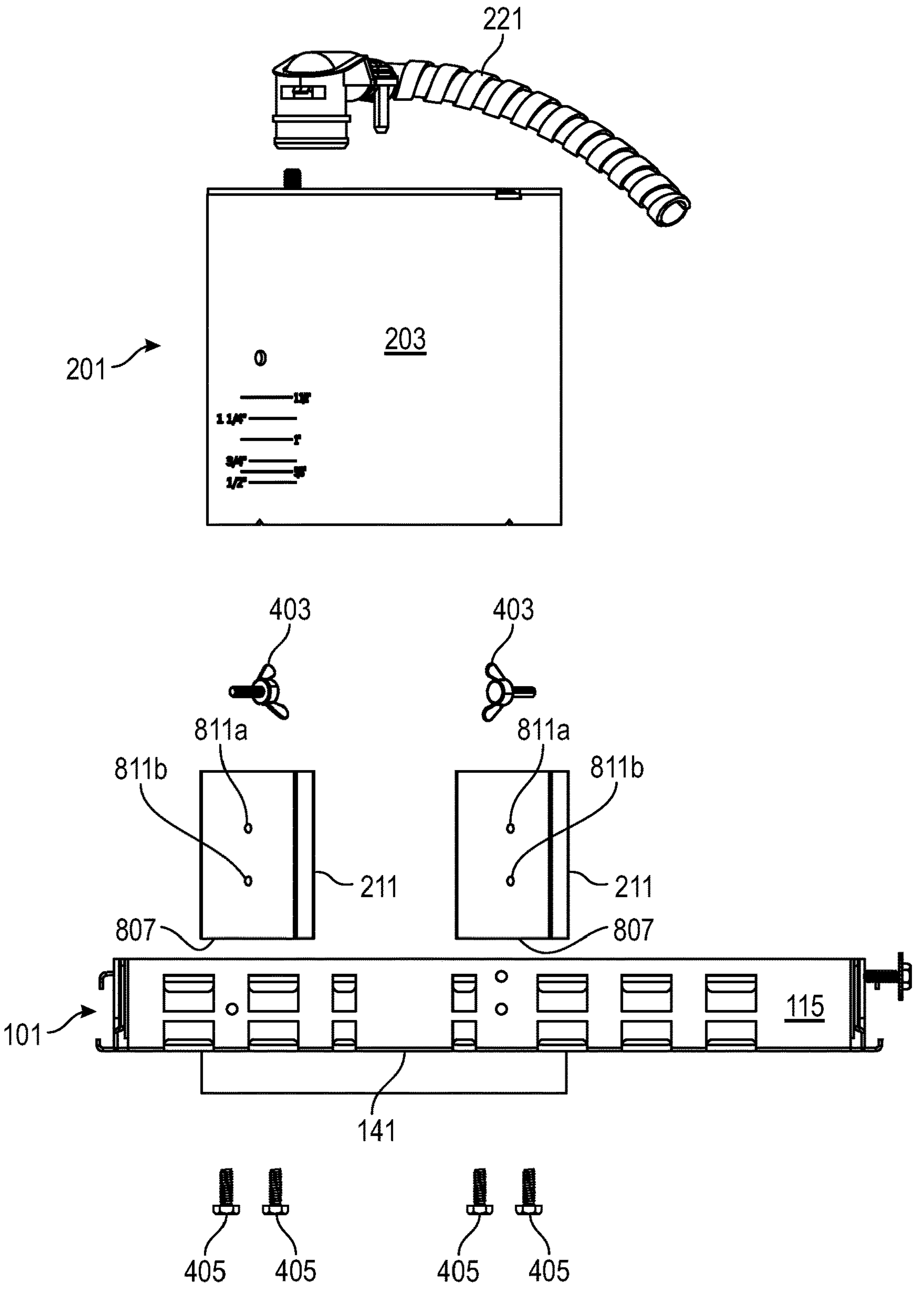
FIG. 4C shows an exploded front view (e.g., similar to the view of FIG. 1D) of a light-fixture-can and at least two (2) I-brackets separated from a frame-assembly.

FIG. 4C shows an exploded front view (e.g., similar to the view of FIG. 1D) of a light-fixture-can 201 and at least two (2) I-brackets 211 separated from frame-assembly 101; FIG. 4C shows an exploded front view of FIG. 4B. FIG. 4C also shows mechanical-fastener(s) 405. In some embodiments, mechanical-fastener 405 may be configured to (removably) attach a given I-bracket 211 to largest-planar-member 103. In some embodiments, a threaded portion of 405 may pass from bottom-surface 141 of largest-planar-member 103 into hole 111 and then into hole 813 of the given I-bracket 211 to (removably) secure that given I-bracket 211 to top-surface 105 of largest-planar-member 103. In some embodiments, mechanical-fastener 405 may be a screw, a bolt, a pin, a rod, a threaded rod, a dowel, a rivet, and/or the like. In some embodiments, frame-assembly-with-hanger-bars 100, frame-assembly 101, largest-planar-member 103, I-bracket 211, and/or frame-assembly-with-hanger-bars 300 may comprise at least one mechanical-fastener 405. In some embodiments, each I-bracket 211 may be configured to (removably) receive a portion of at least one mechanical-fastener 405. In some embodiments, each (bottom) hole 813 of a given I-bracket 211 may be configured to receive a portion of one mechanical-fastener 405. In some embodiments, when mechanical-fastener(s) 405 are being used to (removably) attach (secure) a given I-bracket 211 to top-surface 105 of largest-planar-member 103, at least some of bottom-flat-planar-surface 807 of the given I-bracket 211 may be in direct physical contact with at least some portion of top-surface 105 of largest-planar-member 103. In some embodiments, a given hole 111 may be at least partially occupied by an elongate (threaded) portion of mechanical-fastener 405. In some embodiments, a head of mechanical-fastener 405 may remain on bottom-surface 141 of largest-planar-member 103. Thus, any hole 111 shown in the figures may be configured to (removably) receive an elongate (threaded) portion of mechanical-fastener 405.

Figure 4D:
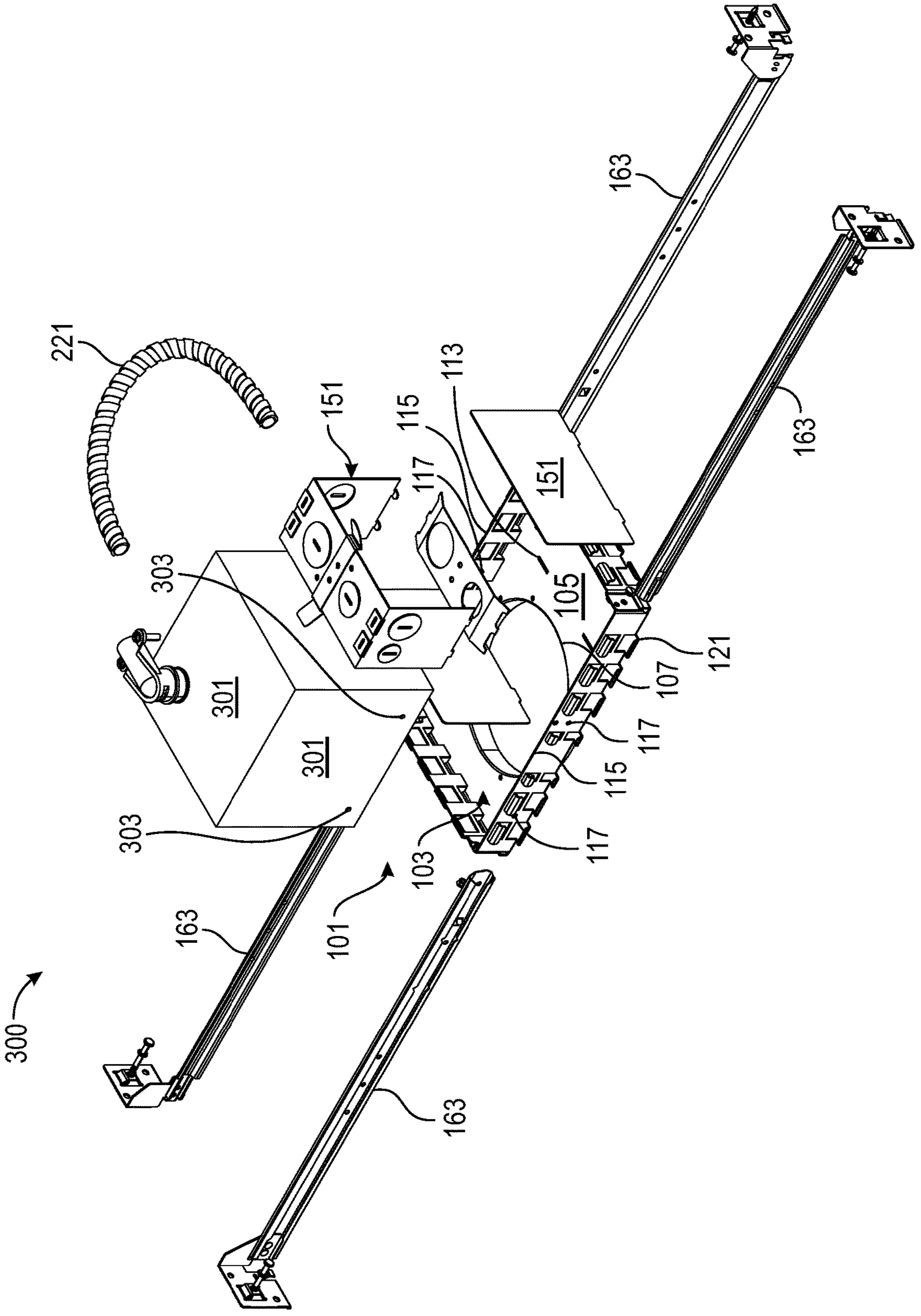
FIG. 4D shows an exploded top perspective view of a frame-assembly-with-junction-box.
Figure 4E:
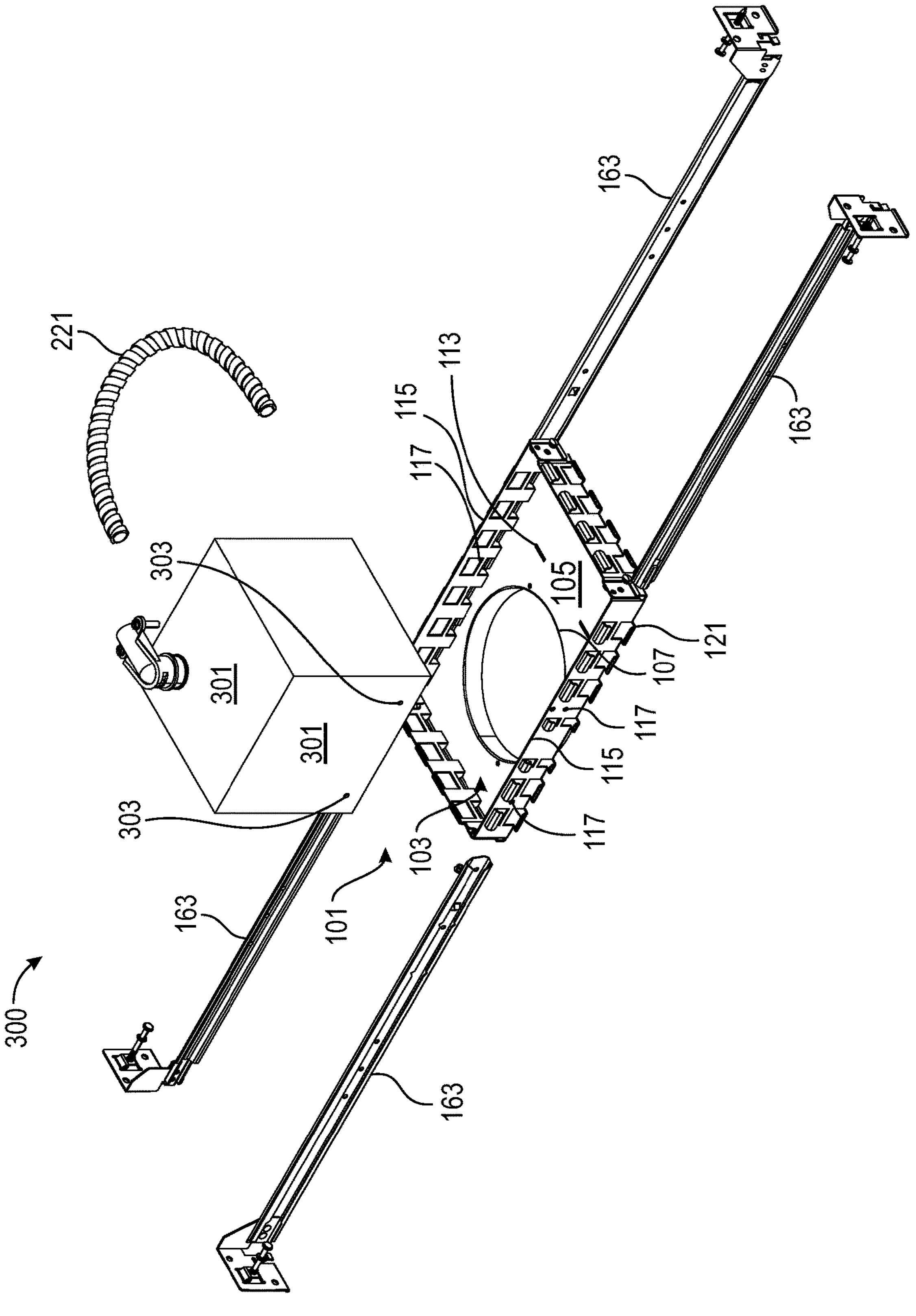
FIG. 4E shows an exploded top perspective view of a frame-assembly-with-junction-box.

FIG. 4D shows an exploded top perspective view of frame-assembly-with-junction-box 300. FIG. 4D shows junction-box 151 exploded away from largest-planar-member 103. In some embodiments, junction-box 151 may be formed from a plurality of sidewall elements/members. FIG. 4D shows the hanger-bars 161 exploded away from the two opposing longer-side-walls 115. FIG. 4D shows junction-box 301 exploded directly above (but still covering) largest-hole 107 and/or collar-of-largest-hole 109 and detached from the two opposing longer-side-walls 115. FIG. 4E is the same exploded top perspective view of FIG. 4D of frame-assembly-with-junction-box 300, but in FIG. 4E junction-box 151 is not shown.

Figure 5:
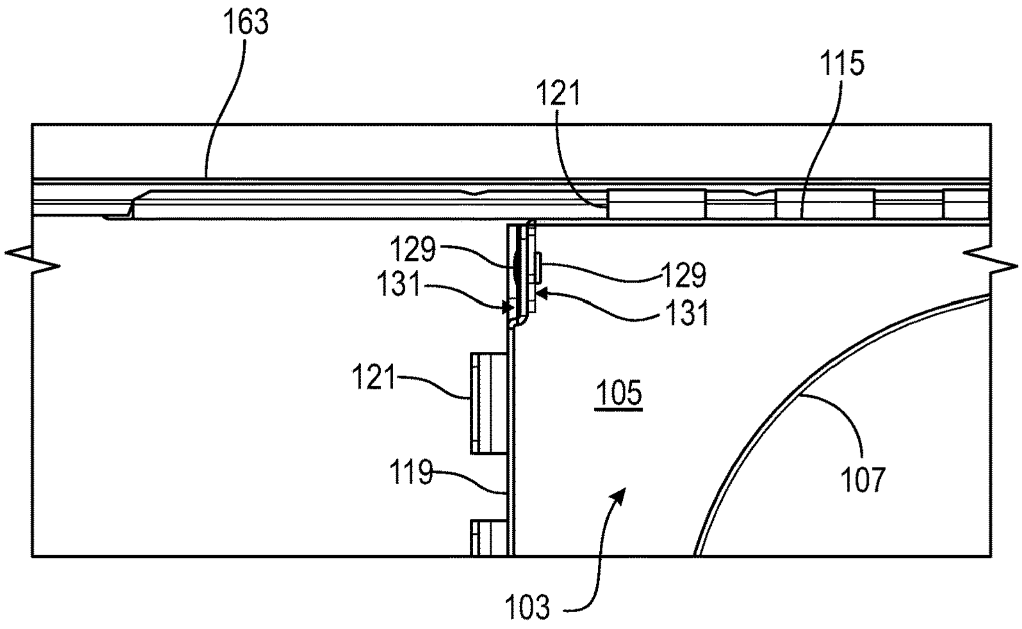
FIG. 5 shows a close-up top view of one (of four) corner regions of the sidewalls of a frame-assembly, that shows a double-wall thickness of corner regions.

FIG. 5 shows a close-up top view of one (of four) corner regions of frame-assembly 101, that shows the double-wall thickness of corner-region-of-double-wall-thickness 131. In some embodiments, mechanical-fastener 129 may pass through both walls of corner-region-of-double-wall-thickness 131. In some embodiments, mechanical-fastener 129 may pass through both walls of longer-side-wall 115 and of shorter-side-wall 119 at corner-region-of-double-wall-thickness 131. FIG. 5 also shows how the terminal end of 115 is bent ninety (90) degrees inward, so that a terminal end of shorter-side-wall 119 may then overlap the bent terminal end portion of longer-side-wall 115 to form a given corner-region-of-double-wall-thickness 131. This arrangement/configuration allows both corner-region-of-double-wall-thickness 131 and mechanical-fastener 129 to not interfere with the hanger-bars 161. See also FIG. 6.

Figure 6:
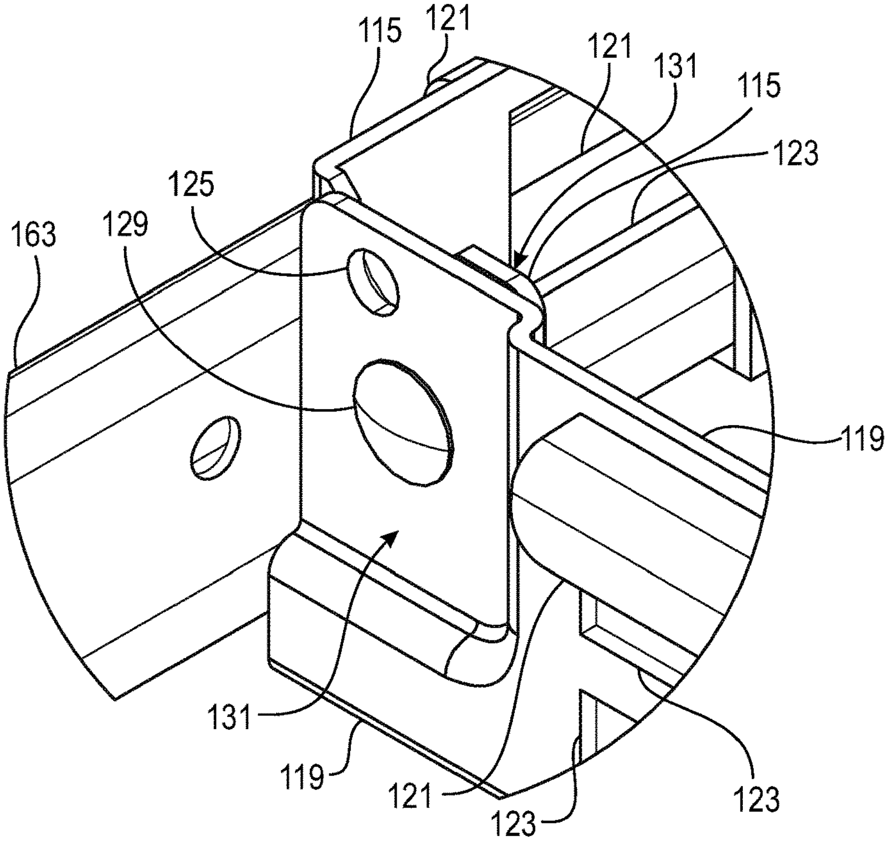
FIG. 6 shows a close-up detailed top perspective view of a corner-region-of-double-wall-thickness of the sidewalls of a frame-assembly.

FIG. 6 shows a close-up detailed top perspective view of corner-region-of-double-wall-thickness 131. In some embodiments, hole 401 and mechanical-fastener 129 may be located below hole 125 on a given terminal end of shorter-side-wall 119. Note, the head of mechanical-fastener 129 covers over hole 401 in FIG. 6. Thus, the riveted (or the like) and double-walled corners (e.g., corner-regions-of-double-wall-thickness 131) of frame-assembly 101 are interlocked which provides greater structural support so that frame-assembly 101 may handle larger loads as compared to a situation with such interlocked double-walled corners.

Figure 7:
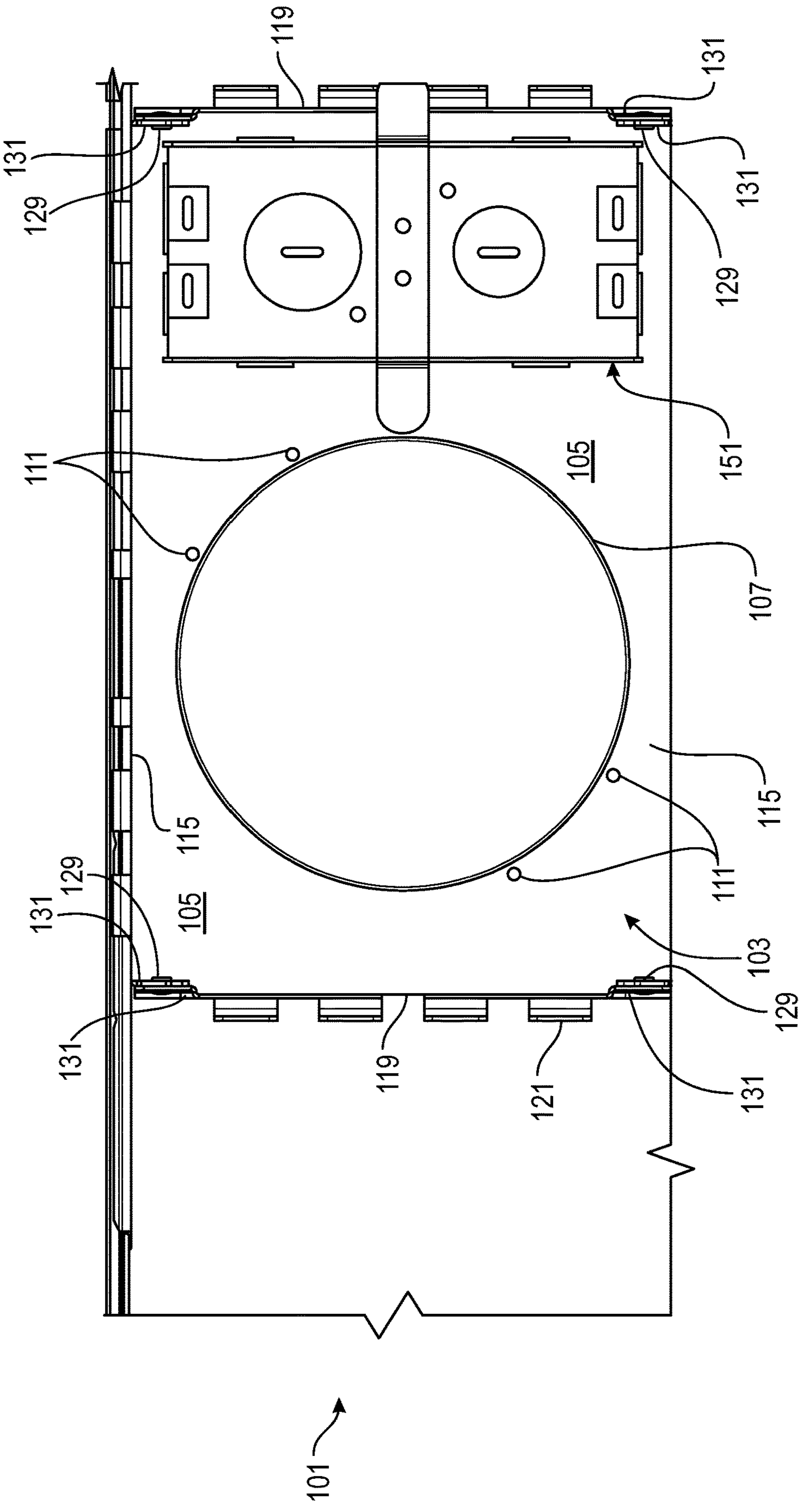
FIG. 7 shows a closer up top view of a portion of a frame-assembly-with-hanger-bars, similar to FIG. 1H.

FIG. 7 shows a closer up top view of a portion of frame-assembly-with-hanger-bars 100, similar to FIG. 1H. FIG. 7 shows the two opposing pairs of adjacent-holes 111 on largest-planar-member 103. Recall each pair of these adjacent-holes 111 may be used to (removably) attach to a given I-bracket 211. The four (4) corner-regions-of-double-wall-thickness 131 are all visible in FIG. 7 at each corner of frame-assembly 101. The four (4) mechanical-fasteners 129 are all visible in FIG. 7 securing each of the four (4) corner-regions-of-double-wall-thickness 131. A ground-screw/bolt 145 is also shown in FIG. 7 attached to a shorter-side-wall 119 above one of the four (4) mechanical-fasteners 129.

Figure 8A:
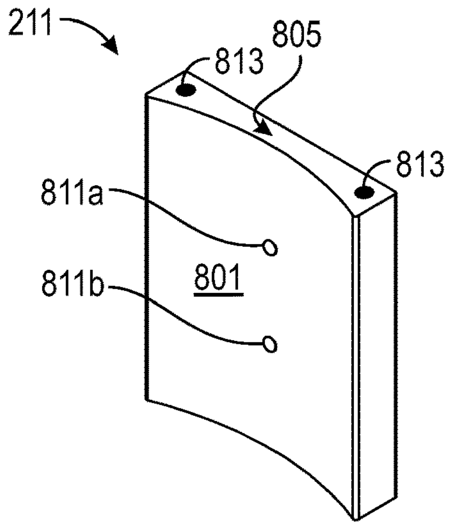
FIG. 8A shows a top inside perspective view of a given I-bracket.

FIG. 8A shows a top inside perspective view of a given I-bracket 211. In some embodiments, I-bracket 211 may be an intermediary component that is used to (removably) attach light-fixture-can 201 to largest-planar-member 103. In some embodiments, two or more I-brackets 211 may be used to (removably) attach light-fixture-can 201 to largest-planar-member 103. In some embodiments, the two or more I-brackets 211 may be arranged equidistant from each other around largest-hole 107 on largest-planar-member 103. In some embodiments, I-bracket 211 may also be configured to setting and/or changing a height/depth setting of light-fixture-can 201 (or a portion of light-fixture-can 201, such as, but not limited to the bottom-most portion of sidewall 203 member) with respect to frame-assembly 101 (or a portion of frame-assembly 101). In some embodiments, I-bracket 211 may be a substantially enclosed 3D object with six largely orthogonal sides, similar to a rectangular prism, except one side is a concave-surface 801; whereas, the remaining five (5) orthogonal sides may be at least substantially (mostly) flat and planar.

Continuing discussing FIG. 8A, in some embodiments, I-bracket 211 may be longer than wide and wider than thick. In some embodiments, the length of I-bracket 211 may be uniform, non-variable, and fixed. In some embodiments, the width of I-bracket 211 may be uniform, non-variable, and fixed. However, the thickness of I-bracket 211 is not uniform and does vary across its width, being thinnest towards (at) a middle of the width and thickest at the opposing edges of the width. In some embodiments, this variable (non-uniform) thickness of I-bracket 211 may be due to concavity (of at least one exterior surface I-bracket 211). When this shape of I-bracket 211 is viewed from above, this shape resembles a capital letter "I." See also FIG. 8C which shows this "I" shape of I-bracket 211. It is this shape that gives I-bracket 211 its name.

Figure 8B:
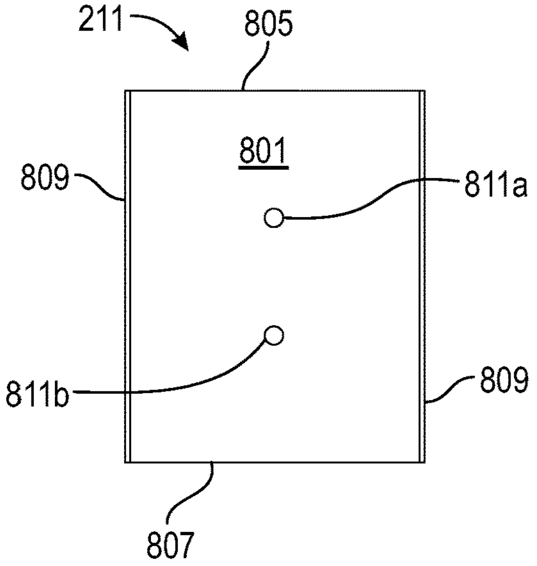
FIG. 8B shows an inside view of the I-bracket of FIG. 8A.
Figure 8C:
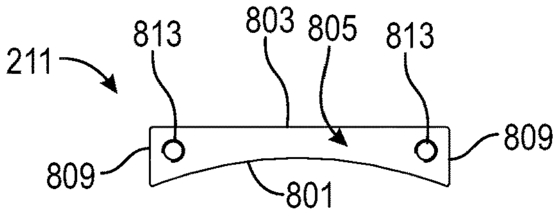
FIG. 8C shows a top view of the I-bracket of FIG. 8A.

In FIG. 8A three of these six orthogonal sides of I-bracket 211 may be visible, namely, concave-surface 801, top-flat-planar-surface 805, and one of the two opposing sides-flat-planar-surface 809. The orthogonal side opposite of concave-surface 801, of opposite-flat-planar-surface 803 is shown in FIG. 8C. The orthogonal side opposite of top-flat-planar-surface 805, of bottom-flat-planar-surface 807 is shown in FIG. 8B, in FIG. 8D, and in FIG. 8E. Both of the opposing orthogonal sides, of sides-flat-planar-surface 809 are shown in FIG. 8B and in FIG. 8C.

Continuing discussing FIG. 8A, in some embodiments, concave-surface 801, opposite-flat-planar-surface 803, top-flat-planar-surface 805, bottom-flat-planar-surface 807, and the two opposing sides-flat-planar-surface 809 together may enclose and form the overall six sided closed 3D shape of I-bracket 211. In some embodiments, opposite-flat-planar-surface 803, top-flat-planar-surface 805, bottom-flat-planar-surface 807, and the two opposing sides-flat-planar-surface 809 each and/or all may have at least substantially flat and/or planar surfaces; whereas, concave-surface 801 may have a concave surface. In some embodiments, the curvature/concavity of concave-surface 801 may match and/or may be complementary to the exterior curvature of cylindrical sidewall 203 member. In some embodiments, when I-bracket 211 may be attached to light-fixture-can 201, concave-surface 801 may be in direct physical contact with at least an exterior portion of cylindrical sidewall 203 member. In some embodiments, opposite vertical edges of concave-surface 801 may have a bevel/chamfer. In some embodiments, concave-surface 801 and opposite-flat-planar-surface 803 may be oppositely disposed side/surfaces of I-bracket 211. In some embodiments, top-flat-planar-surface 805 and bottom-flat-planar-surface 807 may be oppositely disposed side/surfaces of I-bracket 211. In some embodiments, the two (2) sides-flat-planar-surface 809 may be oppositely disposed side/surfaces of I-bracket 211. In some embodiments, edges of concave-surface 801 may attach to top-flat-planar-surface 805, bottom-flat-planar-surface 807, and the two (2) opposing sides-flat-planar-surface 809. In some embodiments, edges of opposite-flat-planar-surface 803 may attach to top-flat-planar-surface 805, bottom-flat-planar-surface 807, and the two (2) opposing sides-flat-planar-surface 809. In some embodiments, opposite-flat-planar-surface 803 may be at least substantially orthogonal to top-flat-planar-surface 805, to bottom-flat-planar-surface 807, and/or to the two (2) opposing sides-flat-planar-surface 809. In some embodiments, top-flat-planar-surface 805 may be at least substantially orthogonal to opposite-flat-planar-surface 803 and/or to the two (2) opposing sides-flat-planar-surface 809. In some embodiments, bottom-flat-planar-surface 807 may be at least substantially orthogonal to opposite-flat-planar-surface 803 and/or to the two (2) opposing sides-flat-planar-surface 809. In some embodiments, a given side-flat-planar-surface 809 may be at least substantially orthogonal to opposite-flat-planar-surface 803, to top-flat-planar-surface 805, and/or to bottom-flat-planar-surface 807.

FIG. 8A also shows holes 811. In some embodiments, I-bracket 211 may comprise at least one hole 811. In some embodiments, I-bracket 211 may comprise two or more holes 811. In some embodiments, only one given hole 811 may be used at a time for (removable) attachment of I-bracket 211 to sidewall 203 member of light-fixture-can 201 (via a hole in sidewall 203 member and with a mechanical-fastener). In some embodiments, hole 811 may be a through hole that passes from concave-surface 801 to opposite-flat-planar-surface 803.

FIG. 8B shows an inside view of the I-bracket 211 of FIG. 8A, i.e., the side of I-bracket 211 that physically contacts sidewall 203 member. FIG. 8B shows concave-surface 801, top-flat-planar-surface 805, bottom-flat-planar-surface 807, and the two opposing sides-flat-planar-surface 809. Opposite-flat-planar-surface 803 is not visible in FIG. 8B. FIG. 8B also shows hole(s) 811. In some embodiments, with respect to the uniform width of I-bracket 211 (e.g., from one side-flat-planar-surface 809 to the other opposing side-flat-planar-surface 809) the hole(s) 811 may be located at half of this uniform width. In some embodiments, when I-bracket 211 may comprise two or more holes 811, those holes 811 may be vertically stacked with one such hole 811 on top of the other hole 811, but fixedly spaced apart from each other by a fixed, finite, and predetermined distance. In some embodiments, it is this fixed, finite, and predetermined distance between a pair of holes 811 of a single I-bracket 211 that permits the height/depth of light-fixture-can 201 to be set at least two different settings (e.g., with respect to frame-assembly 101). In some embodiments, this fixed, finite, and predetermined distance between the centers of a pair of holes 811 of a single I-bracket 211 may be 0.625 inches (5/8 inches); whereas, in other embodiments, this distance may be different.

In some embodiments, the at least two different holes 811 may be termed a top-hole 811*a* and a bottom-hole 811*b*. Alternatively, the top-hole 811*a* may be designated a first-hole 811*a*; while the bottom-hole 811*b* may be designated as a second-hole 811*b*. Alternatively, the top-hole 811*a* may be designated a second-hole 811*a*; while the bottom-hole 811*b* may be designated as a first-hole 811*b*. Note, when the "a" and/or the "b" are not referenced then reference numeral "811" may refer to either such hole on a given I-bracket 211. See e.g., FIG. 8A and/or FIG. 8B.

FIG. 8C shows a top view of the I-bracket 211 of FIG. 8A. Opposite-flat-planar-surface 803 is visible in FIG. 8C. The capital letter "I" shape of I-bracket 211 when viewed from above (or below) is shown by FIG. 8C. FIG. 8C also shows holes 813. In some embodiments, hole 813 may be configured for (removable) attachment of I-bracket 211 to adjacent-hole 111 of largest-planar-member 103 and via use of a mechanical-fastener. In some embodiments, hole 813 may run vertically and linearly straight from bottom-flat-planar-surface 807 to top-flat-planar-surface 805. In some embodiments, hole 813 may be drilled into top-flat-planar-surface 805 and/or into bottom-flat-planar-surface 807. See e.g., FIG. 8E. In some embodiments, hole 813 may not be present at top-flat-planar-surface 805. In some embodiments, I-bracket 211 may comprise at least one hole 813. In some embodiments, I-bracket 211 may comprise a pair of fixedly spaced apart holes 813. In some embodiments, I-bracket 211 may comprise two or more holes 813. In some embodiments, the fixed spacing between two holes 813 of a single I-bracket 211 may be the same/identical as to the fixed spacing between a pair of adjacent-holes 111 of largest-planar-member 103 (see e.g., FIG. 7).

Figure 8D:
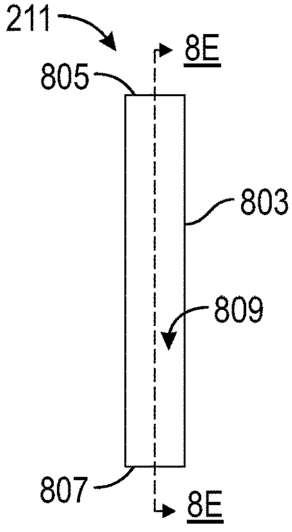
FIG. 8D shows a side view (left or right) of the I-bracket of FIG. 8A.

FIG. 8D shows a side view of the I-bracket 211 of FIG. 8A. FIG. 8D includes sectional-line 8E-8E that runs vertically through the overall length/height of I-bracket 211. FIG. 8D shows the thickest portions of I-bracket 211, which are at the two opposing vertical sides-flat-planar-surface 809.

Figure 8E:
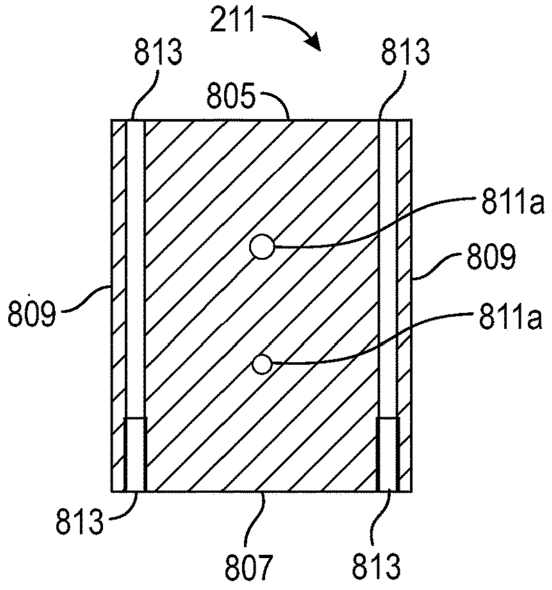
FIG. 8E shows a cross-sectional view of the I-bracket of FIG. 8A along sectional-line 8E-8E.

FIG. 8E shows a cross-sectional view of the I-bracket 211 of FIG. 8A along sectional-line 8E-8E. FIG. 8E shows a vertical cross-section through holes 813. In some embodiments, holes 813 may run vertically and linearly straight from bottom-flat-planar-surface 807 to top-flat-planar-surface 805. In some embodiments, holes 813 may be drilled (formed) into top-flat-planar-surface 805 and/or into bottom-flat-planar-surface 807. In some embodiments, at least some portion of holes 813 may be female/inside threaded to complement receiving a threaded mechanical-fastener (such as, but not limited to, mechanical-fastener 405). In some embodiments, at least some portion of holes 813 closest to bottom-flat-planar-surface 807 may be female/inside threaded to complement receiving a threaded mechanical-fastener (such as, but not limited to, mechanical-fastener 405).

Note, in some embodiments, I-brackets 211 may replace the "mounting-ears 307" taught in U.S. non-provisional utility patent application of patent application Ser. No. 17/725,380 that was filed on Apr. 20, 2022. This patent application Ser. No. 17/725,380 is incorporated herein by reference in its entirety as if fully set forth herein. Similarly, in some embodiments, I-brackets 211 may replace "L" shaped brackets, wherein such "L" shaped brackets might be used to attach a light fixture can to a lighting frame member.

In some embodiments, I-bracket 211 may be referred to as bracket 211. In some embodiments, bracket 211 is configured for attaching to light-fixture-can 201 (in particular to sidewall 203 member) and is also configured for attaching to frame 101 (in particular to largest-planar-member 103). In some embodiments, frame 101 is configured for supporting light-fixture-can 201. In some embodiments, bracket 211 is a substantially enclosed three-dimensional shape that comprises six sides: (1) a concave-surface 801, (2) an opposite-flat-planar-surface 803, (3) a top-flat-planar-surface 805, (4) a bottom-flat-planar-surface 807, and (5) two opposing side-flat-planar-surfaces 809. In some embodiments, concave-surface 801 is disposed opposite from opposite-flat-planar-surface 803. In some embodiments, top-flat-planar-surface 805 is disposed opposite from bottom-flat-planar-surface 807. In some embodiments, opposite-flat-planar-surface 803 is directly attached to top-flat-planar-surface 805, bottom-flat-planar-surface 807, and the two opposing side-flat-planar-surfaces 809. In some embodiments, bracket 211 comprises at least one hole-for-light-fixture-can-attachment 811 that is configured for attaching to sidewall 203 member of light-fixture-can 201. In some embodiments, bracket 211 comprises at least one hole-for-frame-attachment 813 that is configured for attaching to frame 101 (e.g., to largest-planar-member 103). See e.g., FIG. 8A to FIG. 8E. See also, FIG. 2A and FIG. 4B.

In some embodiments, bracket 211 is longer than wide and wider than thick. In some embodiments, bracket 211 has single, fixed, and uniform length. In some embodiments, bracket 211 has a single, fixed, and uniform width. See e.g., FIG. 8A to FIG. 8D. In some embodiments, bracket 211 has a non-uniform thickness that is thinnest towards (at) a middle of the width and thickest disposed away from that middle. See e.g., FIG. 8C. In some embodiments, when the substantially enclosed three-dimensional shape of bracket 211 is viewed from above (e.g., FIG. 8C) or from below, this substantially enclosed three-dimensional shape resembles a capital letter "I" by the substantially enclosed three-dimensional shape being thinnest towards (at) its middle and thickest disposed away from the middle. See e.g., FIG. 8C.

In some embodiments, the at least one hole-for-light-fixture-can-attachment 811 and the at least one hole-for-frame-attachment 813 are located on different sides of bracket 211. See e.g., FIG. 8E.

In some embodiments, the at least one hole-for-light-fixture-can-attachment 811 runs from and through the concave-surface 801 to the opposite-flat-planar-surface 803. In some embodiments, the at least one hole-for-light-fixture-can-attachment comprises 811 two different holes, top-hole 811*a* and bottom-hole 811*b*. In some embodiments, bracket 211 is attached to light-fixture-can 201, only one of the two different holes is used. See e.g., FIG. 9A and FIG. 9B. In some embodiments, the top-hole 811*a* and bottom-hole 811*b* are fixedly spaced apart from each other. In some embodiments, intended use of top-hole 811*a* permits light-fixture-can 201 to be set at a first-height 903 with respect to frame 101. In some embodiments, intended use of bottom-hole 811*b* permits light-fixture-can 201 to be set a second-height 913 with respect to frame 101. In some embodiments, first-height 903 and second-height 913 are different from each other. See e.g., FIG. 9A and FIG. 9B.

In some embodiments, the at least one hole-for-frame-attachment 813 is located on bottom-flat-planar-surface 807 and extends into the substantially enclosed three-dimensional shape of bracket 211 from bottom-flat-planar-surface 807. See e.g., FIG. 8E.

In some embodiments, concave-surface 801 has a curvature that is substantially concentric with an exterior curvature of the sidewall 203 member of light-fixture-can 201. In some embodiments, when bracket 211 is attached to the light-fixture-can 201, at least some of the concave-surface 801 is physically touching at least some of the exterior curvature of the sidewall 203 member. See e.g., FIG. 2A, FIG. 4B, FIG. 9A, and FIG. 9B.

Figure 9A:
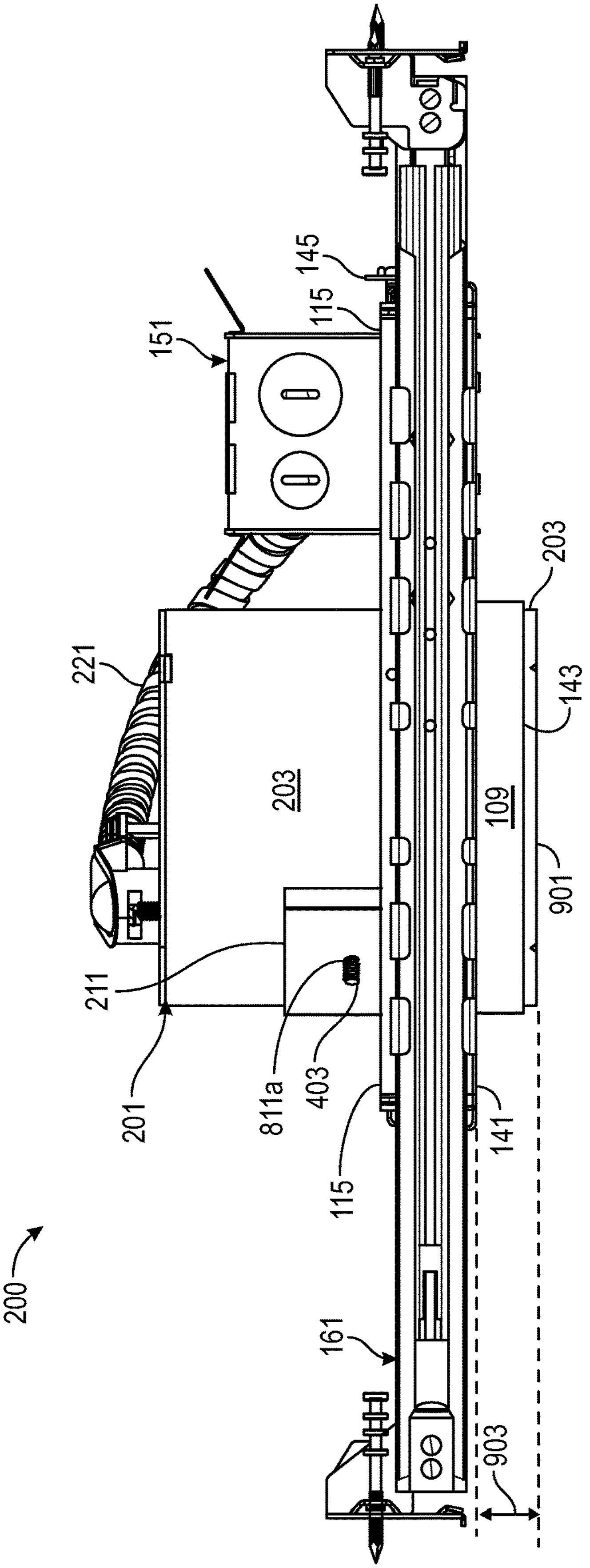
Figure 9B:
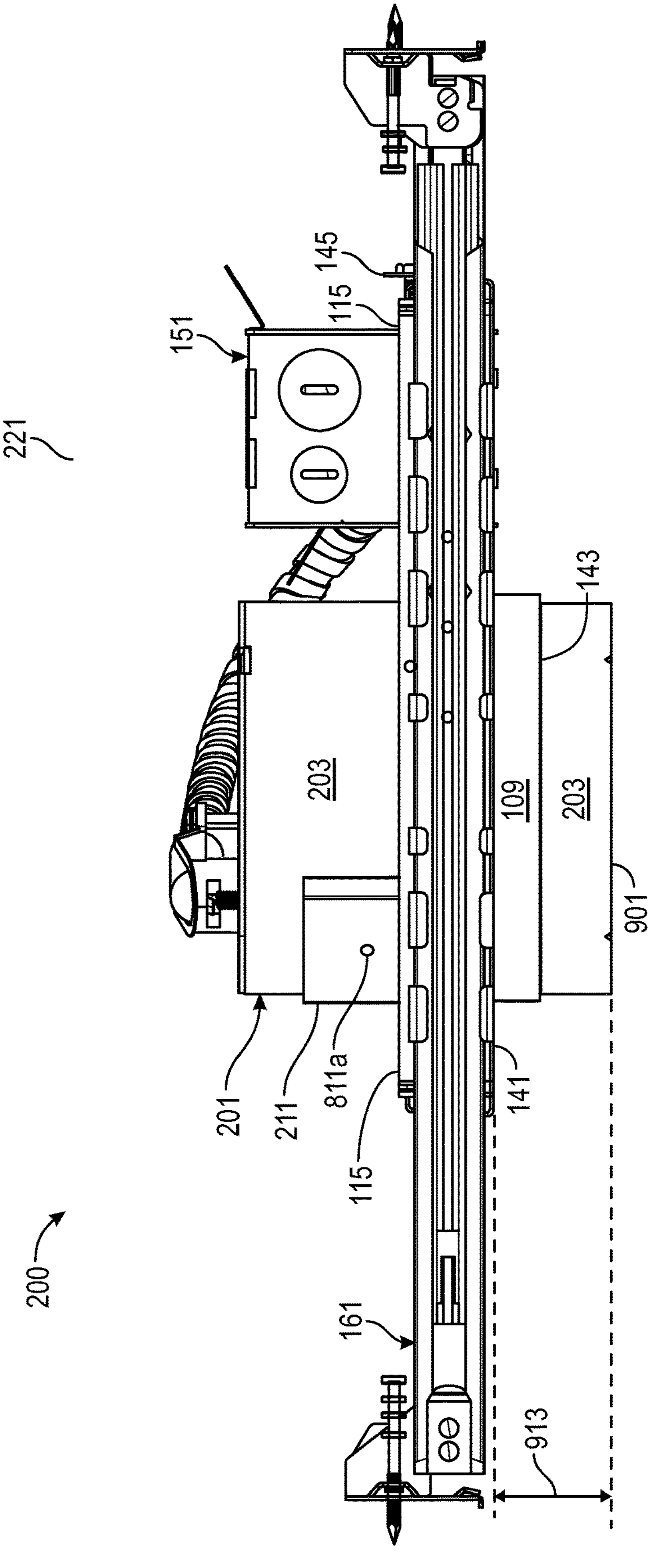

FIG. 9A and FIG. 9B show similar front views as of FIG. 1D, except frame-assembly-with-lighting-can 200 (e.g., with light-fixture-can 201 and with I-brackets 211) and not just frame-assembly-with-hanger-bars 100 (without light-fixture-can 201 and without I-brackets 211) is shown in FIG. 9A and FIG. 9B. Further, FIG. 9A and FIG. 9B show light-fixture-can 201 mounted at two different and distinct heights with respect to frame-assembly 101. FIG. 9A shows bottom 901 (of light-fixture-can 201) at one predetermined, fixed (but adjustable), and particular first-height-setting-configuration 903. Whereas, FIG. 9B shows bottom 901 at one predetermined, fixed (but adjustable), and particular second-height-setting-configuration 913. In some embodiments, first-height-setting-configuration 903 and second-height-setting-configuration 913 may be of different dimensions/distances. In some embodiments, bottom 901 may be the bottom-most surface of light-fixture-can 201 and/or of sidewall 203 member. In some embodiments, light-fixture-can 201 and/or sidewall 203 member may comprise bottom 901. In some embodiments, first-height-setting-configuration 903 and/or second-height-setting-configuration 913 may be a distance between bottom 901 (of light-fixture-can 201/sidewall 203 member) and bottom-surface 141 (of largest-planar-member 103). In some embodiments, first-height-setting-configuration 903 is shorter/less than second-height-setting-configuration 913. In some embodiments, second-height-setting-configuration 913 is larger/greater than first-height-setting-configuration 903. In some embodiments, first-height-setting-configuration 903 and/or second-height-setting-configuration 913 are fixed, predetermined, and non-variable; however, first-height-setting-configuration 903 may be changed/adjusted to second-height-setting-configuration 913 (e.g., by changing which holes 811*a* or 811*b* are used); and second-height-setting-configuration 913 may be changed/adjusted to first-height-setting-configuration 903 (e.g., by changing which holes 811*a* or 811*b* are used). In some embodiments, first-height-setting-configuration 903 may be 0.625 inches (⅝ inches). In some embodiments, second-height-setting-configuration 913 may be 1.25 inches. In other embodiments, first-height-setting-configuration 903 and/or second-height-setting-configuration 913 may other dimensions/distances.

Being able to quickly change between first-height-setting-configuration 903 and second-height-setting-configuration 913 (e.g., by changing which holes 811*a* or 811*b* are used) means that same frame-assembly-with-lighting-can 200 may be used in different ceiling installations where the different ceilings, drywalls (sheetrock), and/or of the like may have different thicknesses. Note, the thicknesses of drywall (sheetrock) and/or the like are generally industry standardized (e.g., to achieve different fire ratings and/or to help restrict sound transfer).

In some embodiments, when the top-holes 811*a* are used to (removably) secure the at least two I-brackets to sidewall 203 member (of light-fixture-can 201), then first-height-setting-configuration 903 may result, see e.g., FIG. 9A. Note, in FIG. 9A one of the two opposing top-holes 811*a* is shown with its (removably) attached mechanical-fastener 403. Whereas, in some embodiments, when the bottom-holes 811*b* are used to (removably) secure the at least two I-brackets to sidewall 203 member (of light-fixture-can 201), then second-height-setting-configuration 913 may result, see e.g., FIG. 9B. Note, in FIG. 9B one of the two opposing top-holes 811*a* is shown, but is shown without mechanical-fastener 403 because mechanical-fasteners 403 are now being used with the bottom-holes 811*b* in FIG. 9B; however, the bottom-holes 811*b* and the mechanical-fasteners 403 are not visible in FIG. 9B because the sidewalls of frame-assembly 101 and the hanger-bars 161 are blocking their view.

The I-brackets 211 are (removably) attached to largest-planar-member 103 in only one fixed and non-variable configuration (e.g., the I-brackets 211 are essentially standing in a vertically upright position on top-surface 105 of largest-planar-member 103 and so anchored using mechanical-fasteners and corresponding holes [e.g., adjacent-holes 111 and holes 813]). Whereas, the I-brackets 211 are (removably) attached to sidewall 203 of light-fixture-can 201 in at least two different configurations because of the at least two different vertically oriented holes 811 of top-holes 811*a* or bottom-holes 811*b*. Note, while there may be at least two different configurations with respect to the (removable) attachment between sidewall 203 and I-brackets 211, when either configuration is in use, that attachment is fixed and non-moving. See e.g., FIG. 4B, FIG. 9A, FIG. 9B, FIG. 8A, and FIG. 8B.

Figure 10A:
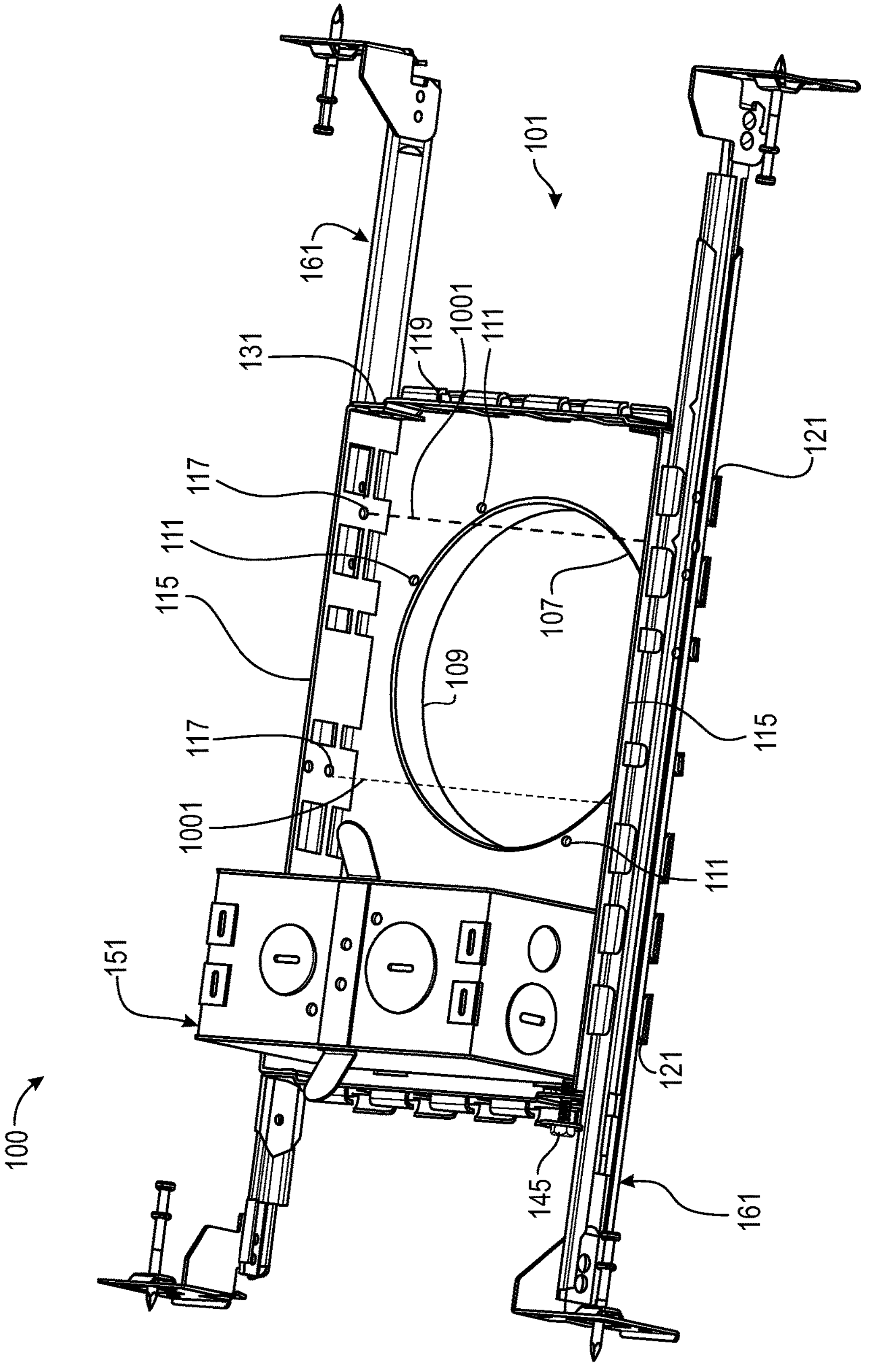
FIG. 10A shows a frame-assembly-with-hanger-bars from a top perspective view.
Figure 10B:
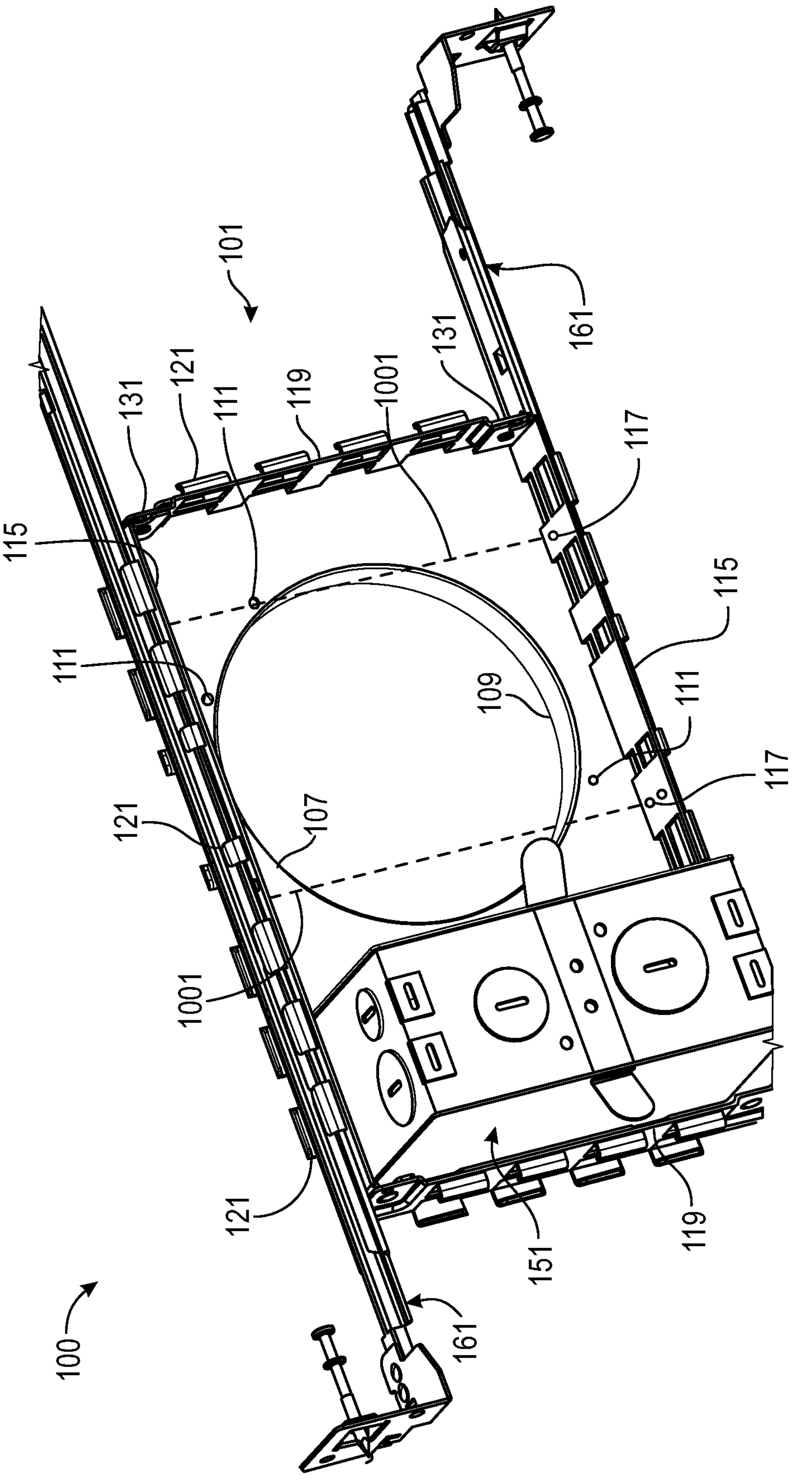
FIG. 10B shows the frame-assembly-with-hanger-bars from a different top perspective view as compared to FIG. 10A.

FIG. 10A and FIG. 10B each shows frame-assembly-with-hanger-bars 100 from a different top perspective view.

FIG. 10A and FIG. 10B are intended to show the four (4) holes 117 on the sidewalls of frame-assembly 101 that may be used (along with appropriate mechanical-fasteners) for (removably) attaching junction-box 301 to these sidewalls of frame-assembly 101. FIG. 10A and FIG. 10B show that each of the two (2) opposing (and parallel) longer-side-walls 115 may comprise two (2) fixedly spaced apart holes 117. Each hole 117 on one given longer-side-wall 115 may be linearly directly opposite from a different hole 117 on the other longer-side-wall 115, such that if an imaginary line 1001 were to join these two opposing holes 117 that imaginary line 1001 would pass over largest-hole 107/collar-of-largest-hole 109 and would be parallel with the two opposing shorter-side-walls 119. In some embodiments, holes 117 of the sidewalls of 101 may be collinearly and concentrically aligned with holes 303 of junction-box 301; and then such aligned holes may be (removably) secured to each other via mechanical-fasteners.

Figure 11A:
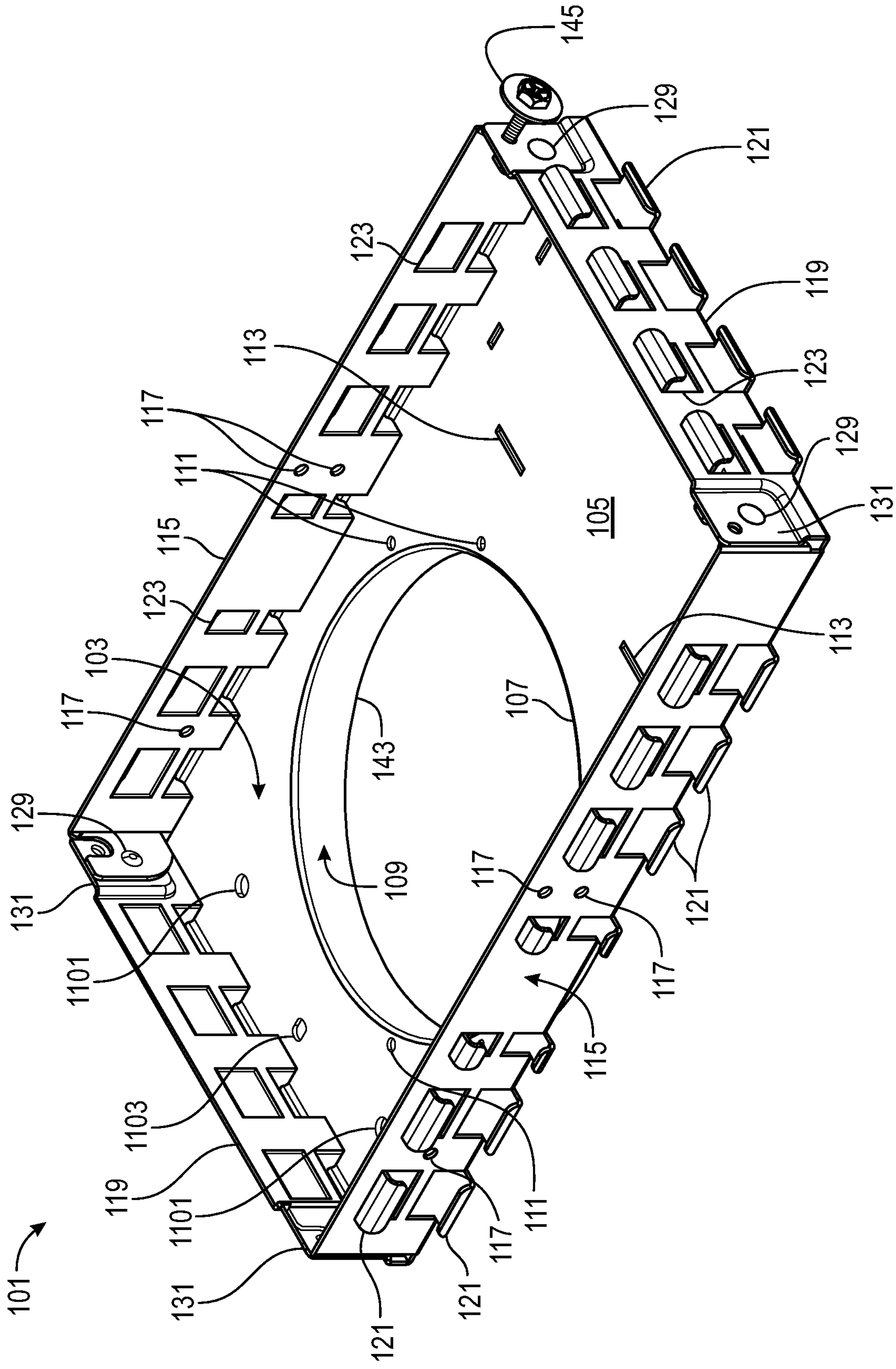
FIG. 11A shows a top perspective view of an embodiment of a frame-assembly.
Figure 11B:
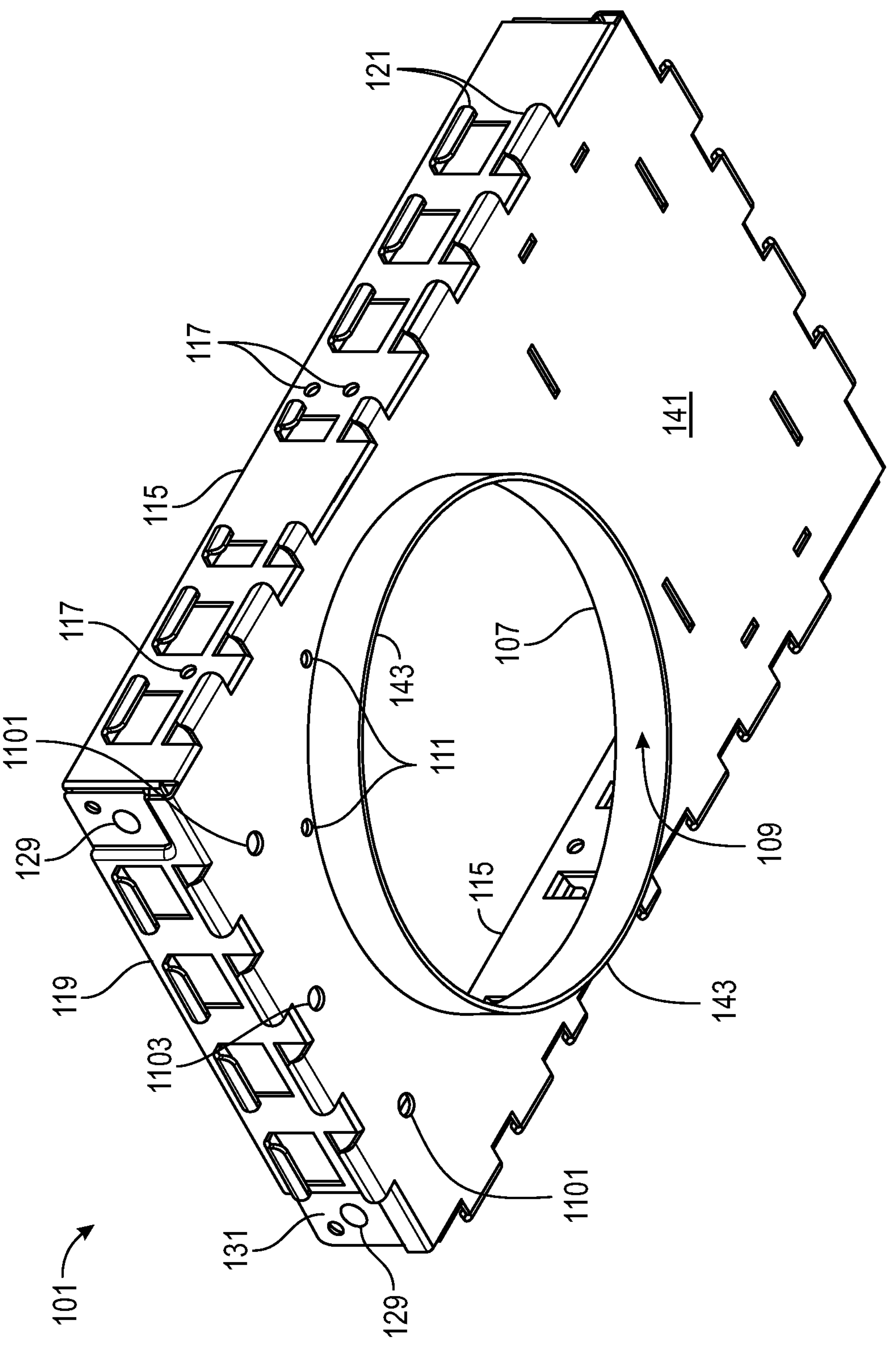
FIG. 11B shows a bottom perspective view of the embodiment of the frame-assembly first shown in FIG. 11A.
Figure 11C:
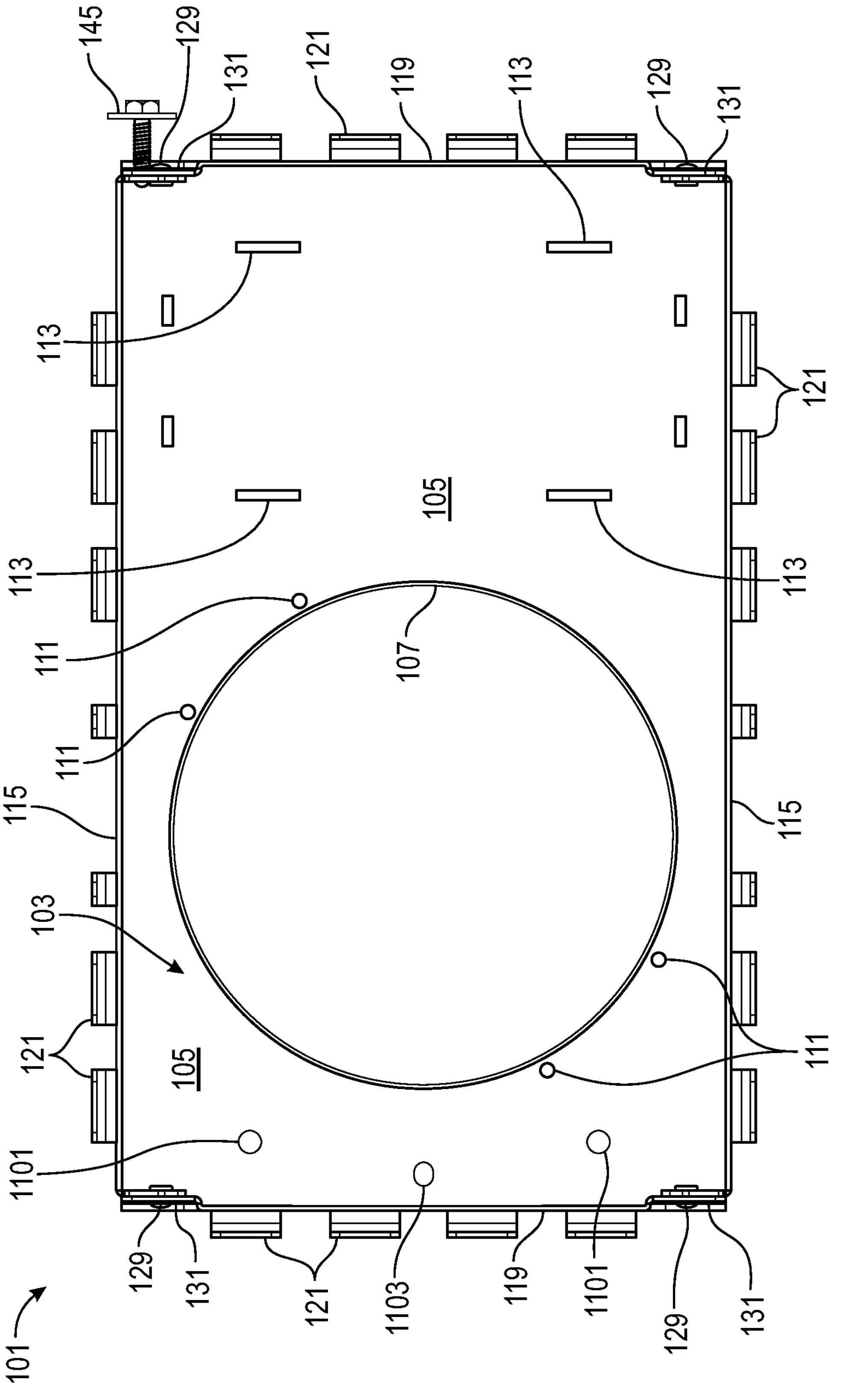
FIG. 11C shows a top view of the embodiment of the frame-assembly first shown in FIG. 11A.

FIG. 11A shows a top perspective view of an embodiment of frame-assembly 101. FIG. 11B shows a bottom perspective view of the embodiment of frame-assembly 101 first shown in FIG. 11A. FIG. 11C shows a top view of the embodiment of frame-assembly 101 first shown in FIG. 11A. In some embodiments, frame-assembly 101 of FIG. 11A, FIG. 11B, and/or FIG. 11C, may differ from frame-assemblies 101 shown and discussed earlier and/or above, by: largest-planar-member 103 comprising three holes/slots 1101/1103 and/or increasing a length of frame-assembly 101, largest-planar-member 103, and/or longer-side-walls 115 where junction-box 151 may (removably) attach to largest-planar-member 103. Otherwise, the frame-assembly 101 of FIG. 11A, FIG. 11B, and/or FIG. 11C may be the same or substantially (mostly) the same as frame-assemblies 101 elsewhere shown and described herein. In some embodiments, disposed within/on largest-planar member 103 may be a plurality of holes/slots 1101/1103. In some embodiments, slots/holes holes/slots 1101/1103 may be through slots and/or through holes of largest-planar member 103. In some embodiments, these holes/slots 1101/1103 may be configured for (removable) attachment of a mounting bracket to bottom-surface 143 through the use of mechanical fasteners (such as, but not limited to screws, bolts, and/or the like). In some embodiments, holes/slots 1101/1103 may be located on largest-planar member 103 that is not configured for receiving (removable) attachment of junction-box 151. In some embodiments, holes/slots 1101/1103 may be located on largest-planar member 103 that are disposed away from slots 113. In some embodiments, holes/slots 1101/1103 may be located on largest planar member 103 that are disposed opposite from slots 113. In some embodiments, holes/slots 1101/1103 may be located closer to shorter-side wall 119 than to largest-hole 107. In some embodiments, of the three holes/slots 1101/1103, two of these may be holes/slots 1101 and one may be elliptical slot/hole 1103. In some embodiments, holes/slots 1101 may be equivalent or near-equivalent in size, plus or minus 10% of a diameter of holes/slots 1101. In some embodiments, elliptical slot/hole 1103 may be located closer to shorter-side wall 119 than holes/slots 1101. In some embodiments, each hole/slot 1101 may be a same distance from elliptical slot/hole 1103. In some embodiments, the two holes/slots 1101 may be oppositely disposed from each other, with elliptical slot/hole 1103 located between the two holes/slots 1101. See e.g., FIG. 11A, FIG. 11B, and/or FIG. 11C.

In some embodiments, disposed within/on largest-planar member 103 may be an elliptical slot/hole 1103. In some embodiments, elliptical slot/hole 1103 may be located along a longitudinal centerline of largest-planar-member 103. In some embodiments, elliptical slot/hole 1103 may be a through slot and/or a through hole of largest-planar member 103. In some embodiments, elliptical slot/hole 1103 may be configured for (removable) attachment of a mounting bracket to bottom-surface 143 through the use of fasteners (such as, but not limited to a screw, bolt, and/or the like). In some embodiments, elliptical slot/hole 1103 may be located further away from largest-hole 107 than holes/slots 1101 are from largest-hole 107. In some embodiments, elliptical slot/hole 1103 may be located closer to shorter-side wall 119 than holes/slots 1101. See e.g., FIG. 11A, FIG. 11B, and/or FIG. 11C.

Frames for use in ceiling lighting applications, as well as I-brackets for removably mounting a light-fixture-can to a given frame have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A frame configured for supporting at least one light fixture, wherein the frame comprises:

a largest-planar-member that has a top-surface and an oppositely disposed bottom-surface that are at least substantially flat and parallel to each other, wherein the largest-planar-member comprises a largest-hole that passes entirely through a thickness of the largest-planar-member, wherein the largest-hole is configured to retain at least a portion of a light-fixture-can that is part of the at least one light fixture, wherein the largest-hole does not rotate against the largest-planar-member; and sidewalls that run around an exterior perimeter of the largest-planar-member and that are attached to the largest-planar-member, wherein the sidewalls extend at least substantially orthogonally upwards and away from the top-surface; wherein two adjacent sidewalls selected from the sidewalls meet each other to form a corner, wherein at least a region of the corner is formed of two overlapping sections of the two adjacent sidewalls such that this at least the region has double wall thickness.

2. The frame according to claim 1, wherein the largest-planar-member comprises two oppositely disposed pairs of adjacent-holes, wherein each pair of the adjacent-holes is located adjacent to the largest-hole, within 0.25 inches from the largest-hole; wherein each pair of the adjacent-holes is configured for attachment to a bracket; wherein the bracket is configured for attachment to the light-fixture-can.

3. The frame according to claim 1, wherein the largest-planar-member comprises a collar-of-largest-hole that is a collar of fixed and uniform height that extends downwards away from the sidewalls and from the largest-hole; wherein the collar-of-largest-hole is configured to guide portions of a sidewall member of the light-fixture-can within the collar-of-largest-hole.

4. The frame according to claim 1, wherein the largest-planar-member comprises at least one slot on the top-surface, wherein the at least one slot is configured for attaching to at least a portion of a junction-box, wherein the junction-box when attached to the top-surface is located above the top-surface and not above the largest-hole.

5. The frame according to claim 1, wherein the frame comprises at least one mechanical-fastener per each of the at least the region of the corner; wherein the at least one mechanical-fastener secures and passes through the double wall thickness.

6. The frame according to claim 1, wherein the sidewalls comprise two longer-side-walls and two shorter-side-walls, wherein the two longer-side-walls are fixedly separated from each other by lengths of the two shorter-side-walls.

7. The frame according to claim 6, wherein lengths of the two longer-side-walls are at least substantially parallel to each other; and wherein the lengths of the two shorter-side-walls are at least substantially parallel to each other.

8. The frame according to claim 6, wherein terminal end portions of the two longer-side-walls are bent inwards such that the terminal end portion of one of the two longer-side-walls is pointed at the terminal end portion of the other of the two longer-side-walls.

9. The frame according to claim 8, wherein the terminal end portions of the two longer-side-walls that are bent inwards forms the two overlapping sections of the two adjacent sidewalls.

10. The frame according to claim 1, wherein the sidewalls are of a single wall thickness everywhere except at the at least the region of the corner.

11. The frame according to claim 1, wherein at least some of exteriors of the sidewalls comprise a plurality of brackets-for-hanger-bar, wherein the plurality of brackets-for-hanger-bar are configured to attach to a hanger-bar, wherein the hanger-bar is configured to attach to two oppositely disposed elongate structural members of a building.

12. The frame according to claim 1, wherein the sidewalls comprise two oppositely disposed sidewalls, wherein each of the two oppositely disposed sidewalls comprises a pair of fixedly separated holes, wherein the pair of fixedly separated holes are configured for attaching to a junction-box, wherein the junction-box when attached to the two oppositely disposed sidewalls entirely covers over the largest-hole.

13. A bracket that is configured for attaching to a light-fixture-can and that is configured for attaching to a frame, wherein the frame is configured for supporting the light-fixture-can, wherein the bracket is a substantially enclosed three-dimensional shape that comprises six sides: (1) a concave-surface, (2) an opposite-flat-planar-surface, (3) a top-flat-planar-surface, (4) a bottom-flat-planar-surface, and (5) two opposing side-flat-planar-surfaces; wherein the concave-surface is disposed opposite from the opposite-flat-planar-surface; wherein the top-flat-planar-surface is disposed opposite from the bottom-flat-planar-surface; wherein the opposite-flat-planar-surface is directly attached to the top-flat-planar-surface, the bottom-flat-planar-surface, and the two opposing side-flat-planar-surfaces; wherein the bracket comprises at least one hole-for-light-fixture-can-attachment that is configured for attaching to a sidewall member of the light-fixture-can; wherein the bracket comprises at least one hole-for-frame-attachment that is configured for attaching to the frame.

14. The bracket according to claim 13, wherein the bracket is longer than wide and wider than thick.

15. The bracket according to claim 13, wherein the bracket has a single, fixed, and uniform length; wherein the bracket has a single, fixed, and uniform width; wherein the bracket has a non-uniform thickness that is thinnest towards a middle of the width and thickest disposed away from that middle.

16. The bracket according to claim 13, wherein when the substantially enclosed three-dimensional shape of the bracket is viewed from above or from below this substantially enclosed three-dimensional shape resembles a capital letter "I" by the substantially enclosed three-dimensional shape being thinnest at its middle and thickest disposed away from the middle.

17. The bracket according to claim 13, wherein the at least one hole-for-light-fixture-can-attachment and the at least one hole-for-frame-attachment are located on different sides of the bracket.

18. The bracket according to claim 13, wherein the at least one hole-for-light-fixture-can-attachment runs from and through the concave-surface to the opposite-flat-planar-surface.

19. The bracket according to claim 13, wherein the at least one hole-for-light-fixture-can-attachment comprises two different holes, a top-hole and a bottom-hole, wherein when the bracket is attached to the light-fixture-can, only one of the two different holes is used.

20. The bracket according to claim 19, wherein the top-hole and the bottom-hole are fixedly spaced apart from each other, wherein use of the top-hole permits the light-fixture-can to be set at a first-height with respect to the frame, wherein use of the bottom-hole permits the light-fixture-can to be set a second-height with respect to the frame.

21. The bracket according to claim 13, wherein the at least one hole-for-frame-attachment is located on the bottom-flat-planar-surface and extends into the substantially enclosed three-dimensional shape of the bracket from the bottom-flat-planar-surface.

22. The bracket according to claim 13, wherein the concave-surface has a curvature that is substantially concentric with an exterior curvature of the sidewall member; wherein when the bracket is attached to the light-fixture-can at least some of the concave-surface is physically touching at least some of the exterior curvature of the sidewall member.

* * * * *